US008364588B2

(12) United States Patent  
Celka et al.

(10) Patent No.: US 8,364,588 B2
(45) Date of Patent: Jan. 29, 2013

(54) SYSTEM AND METHOD FOR AUTOMATED DETECTION OF NEVER-PAY DATA SETS

(75) Inventors: Christopher J. Celka, Suwanee, GA (US); Cristian R. Rojas, San Diego, CA (US)

(73) Assignee: Experian Information Solutions, Inc., Costa Mesa, CA (US)

( * ) Notice: Subject to any disclaimer, the term of this patent is extended or adjusted under 35 U.S.C. 154(b) by 0 days.

(21) Appl. No.: 12/875,045

(22) Filed: Sep. 2, 2010

(65) Prior Publication Data

US 2010/0332381 A1     Dec. 30, 2010

Related U.S. Application Data

(63) Continuation of application No. 12/125,820, filed on May 22, 2008, now abandoned.

(60) Provisional application No. 60/931,902, filed on May 25, 2007.

(51) Int. Cl.
    *G06Q 40/00*           (2012.01)

(52) U.S. Cl. .................... 705/39; 705/1; 705/7; 705/10; 705/14; 705/26; 705/35; 705/36; 705/37; 705/38; 705/40; 705/44; 726/23; 463/42; 235/379; 235/380; 434/322; 398/116

(58) Field of Classification Search .................. 705/1, 7, 705/10, 14, 26, 35, 36, 37, 38, 39, 40, 44; 726/23; 463/42; 235/379, 380; 434/322; 398/116

See application file for complete search history.

(56) References Cited

U.S. PATENT DOCUMENTS

| | | | |
|---|---|---|---|
| 4,491,725 | A | 1/1985 | Pritchard |
| 4,774,664 | A | 9/1988 | Campbell et al. |
| 4,775,935 | A | 10/1988 | Yourick |
| 4,812,628 | A | 3/1989 | Boston et al. |
| 4,827,508 | A | 5/1989 | Shear |
| 4,868,570 | A | 9/1989 | Davis |
| 4,872,113 | A | 10/1989 | Dinerstein |
| 4,935,870 | A | 6/1990 | Burk, Jr. et al. |
| 4,947,028 | A | 8/1990 | Gorog |
| 5,056,019 | A | 10/1991 | Schultz et al. |
| 5,201,010 | A | 4/1993 | Deaton et al. |
| 5,239,462 | A | 8/1993 | Jones et al. |
| 5,247,575 | A | 9/1993 | Sprague et al. |
| 5,301,105 | A | 4/1994 | Cummings, Jr. |
| 5,325,509 | A | 6/1994 | Lautzenheiser |

(Continued)

FOREIGN PATENT DOCUMENTS

| | | |
|---|---|---|
| EP | 0 419 889 | 4/1991 |
| EP | 0 458 698 | 11/1991 |

(Continued)

OTHER PUBLICATIONS

U.S. Appl. No. 12/705,489, filed Feb. 12, 2010, Bargoli et al.

(Continued)

*Primary Examiner* — James Trammell
*Assistant Examiner* — Sanjeev Malhotra
(74) *Attorney, Agent, or Firm* — Knobbe Martens Olson & Bear LLP

(57) ABSTRACT

Data filters, models, and/or profiles for identifying and/or predicting the never-pay population (for example, those customers that make a request for credit and obtain the credit instrument but over the life of the account, never make a payment) can be useful to various commercial entities, such as those issuing mortgages, home equity lines of credit, consumer or business lines of credit, automobile loans, credit card accounts, or those entities providing services, such as utility services, phone services, and the like.

16 Claims, 8 Drawing Sheets

U.S. PATENT DOCUMENTS

| | | | |
|---|---|---|---|
| 5,341,429 A | 8/1994 | Stringer et al. | |
| 5,504,675 A | 4/1996 | Cragun et al. | |
| 5,521,813 A | 5/1996 | Fox et al. | |
| 5,528,701 A | 6/1996 | Aref | |
| 5,555,409 A | 9/1996 | Leenstra, Sr. et al. | |
| 5,557,514 A | 9/1996 | Seare et al. | |
| 5,563,783 A | 10/1996 | Stolfo et al. | |
| 5,583,760 A | 12/1996 | Klesse | |
| 5,583,763 A | 12/1996 | Atcheson et al. | |
| 5,592,560 A | 1/1997 | Deaton et al. | |
| 5,611,052 A | 3/1997 | Dykstra et al. | |
| 3,316,395 A | 4/1997 | Lavin | |
| 5,640,551 A | 6/1997 | Chu et al. | |
| 5,644,778 A | 7/1997 | Burks et al. | |
| 5,649,114 A | 7/1997 | Deaton et al. | |
| 5,655,129 A | 8/1997 | Ito | |
| 5,659,731 A | 8/1997 | Gustafson | |
| 5,666,528 A | 9/1997 | Thai | |
| 5,692,107 A | 11/1997 | Simoudis et al. | |
| 5,696,907 A | 12/1997 | Tom | |
| 5,699,527 A | 12/1997 | Davidson | |
| 5,704,044 A | 12/1997 | Tarter et al. | |
| 5,737,732 A | 4/1998 | Gibson et al. | |
| 5,745,654 A | 4/1998 | Titan | |
| 5,754,938 A | 5/1998 | Herz et al. | |
| 5,764,923 A | 6/1998 | Tallman et al. | |
| 5,768,423 A | 6/1998 | Aref et al. | |
| 5,774,692 A | 6/1998 | Boyer et al. | |
| 5,774,868 A | 6/1998 | Cragun et al. | |
| 5,778,405 A | 7/1998 | Ogawa | |
| 5,797,136 A | 8/1998 | Boyer et al. | |
| 5,802,142 A | 9/1998 | Browne | |
| 5,812,840 A | 9/1998 | Shwartz | |
| 5,819,226 A | 10/1998 | Gopinathan et al. | |
| 5,822,410 A | 10/1998 | McCausland et al. | |
| 5,822,750 A | 10/1998 | Jou et al. | |
| 5,822,751 A | 10/1998 | Gray et al. | |
| 5,832,447 A | 11/1998 | Rieker et al. | |
| 5,835,915 A | 11/1998 | Carr et al. | |
| 5,870,721 A | 2/1999 | Norris | |
| 5,878,403 A | 3/1999 | DeFrancesco | |
| 5,881,131 A | 3/1999 | Farris et al. | |
| 5,884,287 A | 3/1999 | Edesess | |
| 5,884,289 A | 3/1999 | Anderson et al. | |
| 5,905,985 A | 5/1999 | Malloy et al. | |
| 5,907,828 A | 5/1999 | Meyer et al. | |
| 5,912,839 A | 6/1999 | Ovshinsky et al. | |
| 5,926,800 A | 7/1999 | Baronowski et al. | |
| 5,930,759 A | 7/1999 | Moore et al. | |
| 5,930,776 A | 7/1999 | Dykstra et al. | |
| 5,933,809 A | 8/1999 | Hunt et al. | |
| 5,933,813 A | 8/1999 | Teicher et al. | |
| 5,940,812 A | 8/1999 | Tengel et al. | |
| 5,950,179 A * | 9/1999 | Buchanan et al. | 705/38 |
| 5,953,707 A | 9/1999 | Huang et al. | |
| 5,963,932 A | 10/1999 | Jakobsson et al. | |
| 5,966,699 A | 10/1999 | Zandi | |
| 5,970,478 A | 10/1999 | Walker et al. | |
| 5,974,396 A | 10/1999 | Anderson et al. | |
| 5,995,947 A | 11/1999 | Fraser et al. | |
| 6,009,415 A | 12/1999 | Shurling et al. | |
| 6,014,632 A | 1/2000 | Gamble et al. | |
| 6,018,723 A | 1/2000 | Siegel et al. | |
| 6,029,139 A | 2/2000 | Cunningham et al. | |
| 6,029,149 A | 2/2000 | Dykstra et al. | |
| 6,029,154 A | 2/2000 | Pettitt | |
| 6,044,351 A | 3/2000 | Jones | |
| 6,044,352 A | 3/2000 | Deavers | |
| 6,044,357 A | 3/2000 | Garg | |
| 6,067,522 A | 5/2000 | Warady et al. | |
| 6,073,104 A | 6/2000 | Field | |
| 6,073,140 A | 6/2000 | Morgan et al. | |
| 6,088,686 A | 7/2000 | Walker et al. | |
| 6,094,643 A | 7/2000 | Anderson et al. | |
| 6,098,052 A | 8/2000 | Kosiba et al. | |
| 6,108,641 A | 8/2000 | Kenna et al. | |
| 6,119,103 A | 9/2000 | Basch et al. | |
| 6,121,901 A | 9/2000 | Welch et al. | |
| 6,128,624 A | 10/2000 | Papierniak et al. | |
| 6,129,273 A | 10/2000 | Shah | |
| 6,144,948 A | 11/2000 | Walker et al. | |
| 6,144,957 A | 11/2000 | Cohen et al. | |
| 6,151,601 A | 11/2000 | Papierniak et al. | |
| 6,163,770 A | 12/2000 | Gamble et al. | |
| 6,171,112 B1 | 1/2001 | Clark et al. | |
| 6,182,060 B1 | 1/2001 | Hedgcock et al. | |
| 6,185,543 B1 | 2/2001 | Galperin et al. | |
| 6,202,053 B1 | 3/2001 | Christiansen et al. | |
| 6,208,973 B1 | 3/2001 | Boyer et al. | |
| 6,208,979 B1 | 3/2001 | Sinclair | |
| 6,223,171 B1 | 4/2001 | Chaudhuri et al. | |
| 6,236,977 B1 | 5/2001 | Verba et al. | |
| 6,254,000 B1 | 7/2001 | Degen et al. | |
| 6,256,630 B1 | 7/2001 | Gilai et al. | |
| 6,263,334 B1 | 7/2001 | Fayyad et al. | |
| 6,263,337 B1 | 7/2001 | Fayyad et al. | |
| 6,269,325 B1 | 7/2001 | Lee et al. | |
| 6,304,869 B1 | 10/2001 | Moore et al. | |
| 6,311,169 B2 | 10/2001 | Duhon | |
| 6,321,205 B1 | 11/2001 | Eder | |
| 6,330,546 B1 | 12/2001 | Gopinathan et al. | |
| 6,334,110 B1 | 12/2001 | Walter et al. | |
| 6,339,769 B1 | 1/2002 | Cochrane et al. | |
| 6,366,903 B1 | 4/2002 | Agrawal et al. | |
| 6,374,229 B1 | 4/2002 | Lowrey et al. | |
| 6,374,230 B1 | 4/2002 | Walker et al. | |
| 6,385,594 B1 | 5/2002 | Lebda et al. | |
| 6,386,444 B1 | 5/2002 | Sullivan | |
| 6,393,406 B1 | 5/2002 | Eder | |
| 6,405,181 B2 | 6/2002 | Lent et al. | |
| 6,418,436 B1 | 7/2002 | Degen et al. | |
| 6,424,956 B1 | 7/2002 | Werbos | |
| 6,430,539 B1 | 8/2002 | Lazarus et al. | |
| 6,453,297 B1 | 9/2002 | Burks et al. | |
| 6,456,979 B1 | 9/2002 | Flagg | |
| 6,456,983 B1 | 9/2002 | Keyes et al. | |
| 6,460,036 B1 | 10/2002 | Herz | |
| 6,496,819 B1 | 12/2002 | Bello et al. | |
| 6,513,018 B1 | 1/2003 | Culhane | |
| 6,523,022 B1 | 2/2003 | Hobbs | |
| 6,523,041 B1 | 2/2003 | Morgan et al. | |
| 6,542,894 B1 | 4/2003 | Lee et al. | |
| 6,574,623 B1 | 6/2003 | Leung et al. | |
| 6,587,841 B1 | 7/2003 | DeFrancesco | |
| 6,597,775 B2 | 7/2003 | Lawyer et al. | |
| 6,598,030 B1 | 7/2003 | Siegel et al. | |
| 6,611,816 B2 | 8/2003 | Lebda et al. | |
| 6,615,193 B1 | 9/2003 | Kingdon et al. | |
| 6,631,496 B1 | 10/2003 | Li et al. | |
| 6,651,220 B1 | 11/2003 | Penteroudakis et al. | |
| 6,658,393 B1 | 12/2003 | Basch et al. | |
| 6,684,093 B2 | 1/2004 | Kuth | |
| 6,714,918 B2 | 3/2004 | Hillmer et al. | |
| 6,745,938 B2 | 6/2004 | Sullivan | |
| 6,748,426 B1 | 6/2004 | Shaffer et al. | |
| 6,766,327 B2 | 7/2004 | Morgan, Jr. et al. | |
| 6,782,390 B2 | 8/2004 | Lee et al. | |
| 6,804,701 B2 | 10/2004 | Muret et al. | |
| 6,823,319 B1 | 11/2004 | Lynch et al. | |
| 6,826,535 B2 | 11/2004 | Wood et al. | |
| 6,839,682 B1 | 1/2005 | Blume et al. | |
| 6,847,942 B1 | 1/2005 | Land et al. | |
| 6,850,606 B2 | 2/2005 | Lawyer et al. | |
| 6,873,979 B2 | 3/2005 | Fishman et al. | |
| 6,901,406 B2 | 5/2005 | Nabe et al. | |
| 6,959,281 B1 | 10/2005 | Freeling et al. | |
| 6,983,478 B1 | 1/2006 | Grauch et al. | |
| 7,003,491 B2 | 2/2006 | Starkman | |
| 7,003,504 B1 | 2/2006 | Angus et al. | |
| 7,003,792 B1 | 2/2006 | Yuen | |
| 7,028,052 B2 | 4/2006 | Chapman et al. | |
| 7,039,607 B2 | 5/2006 | Watarai et al. | |
| 7,047,251 B2 | 5/2006 | Reed et al. | |
| 7,072,842 B2 | 7/2006 | Provost et al. | |
| 7,082,435 B1 | 7/2006 | Guzman et al. | |
| 7,133,840 B1 | 11/2006 | Kenna et al. | |
| 7,136,448 B1 | 11/2006 | Venkataperumal et al. | |

| | | |
|---|---|---|
| 7,171,371 B2 | 1/2007 | Goldstein |
| 7,174,302 B2 | 2/2007 | Patricelli et al. |
| 7,181,427 B1 | 2/2007 | DeFrancesco |
| 7,184,974 B2 | 2/2007 | Shishido |
| 7,185,016 B1 | 2/2007 | Rasmussen |
| 7,191,150 B1 | 3/2007 | Shao et al. |
| 7,191,451 B2 | 3/2007 | Nakagawa |
| 7,197,468 B1 | 3/2007 | Patricelli et al. |
| 7,200,602 B2 | 4/2007 | Jonas |
| 7,212,995 B2 | 5/2007 | Schulkins |
| 7,234,156 B2 | 6/2007 | French et al. |
| 7,240,059 B2 | 7/2007 | Bagliss et al. |
| 7,246,068 B2 | 7/2007 | Thomas, Jr. |
| 7,246,740 B2 | 7/2007 | Swift et al. |
| 7,249,076 B1 | 7/2007 | Pendleton et al. |
| 7,263,506 B2 | 8/2007 | Lee et al. |
| 7,275,083 B1 | 9/2007 | Seibel et al. |
| 7,277,875 B2 | 10/2007 | Serrano-Morales et al. |
| 7,277,900 B1 | 10/2007 | Ganesh et al. |
| 7,281,652 B2 | 10/2007 | Foss |
| 7,295,988 B1 | 11/2007 | Reeves |
| 7,296,734 B2 | 11/2007 | Pliha |
| 7,298,872 B2 | 11/2007 | Glisson |
| 7,305,359 B2 | 12/2007 | Bonnell |
| 7,314,167 B1 | 1/2008 | Kiliccote |
| 7,328,276 B2 | 2/2008 | Alisuag |
| 7,333,937 B2 | 2/2008 | Baldwin, Jr. et al. |
| 7,340,424 B2 | 3/2008 | Gang et al. |
| 7,340,434 B2 | 3/2008 | Schnall |
| 7,343,149 B2 | 3/2008 | Benco |
| 7,346,576 B2 | 3/2008 | Lent et al. |
| 7,366,694 B2 | 4/2008 | Lazerson |
| 7,370,044 B2 | 5/2008 | Mulhern et al. |
| 7,376,603 B1 | 5/2008 | Mayr et al. |
| 7,379,913 B2 | 5/2008 | Steele et al. |
| 7,380,707 B1 | 6/2008 | Fredman |
| 7,383,215 B1 | 6/2008 | Navarro et al. |
| 7,392,216 B1 | 6/2008 | Palmgren et al. |
| 7,403,942 B1 | 7/2008 | Bayliss |
| 7,409,369 B1 | 8/2008 | Homuth et al. |
| 7,428,509 B2 | 9/2008 | Klebanoff |
| 7,433,855 B2 | 10/2008 | Gavan et al. |
| 7,458,508 B1 | 12/2008 | Shao et al. |
| 7,467,127 B1 | 12/2008 | Baccash et al. |
| 7,472,088 B2 | 12/2008 | Taylor et al. |
| 7,505,939 B2 | 3/2009 | Lent et al. |
| 7,509,117 B2 | 3/2009 | Yum |
| 7,512,221 B2 | 3/2009 | Toms |
| 7,527,967 B2 | 5/2009 | Chao et al. |
| 7,536,346 B2 | 5/2009 | Aliffi et al. |
| 7,542,993 B2 | 6/2009 | Satterfield et al. |
| 7,548,886 B2 | 6/2009 | Kirkland et al. |
| 7,556,192 B2 | 7/2009 | Wokaty, Jr. |
| 7,571,139 B1 | 8/2009 | Giordano et al. |
| 7,575,157 B2 | 8/2009 | Barnhardt et al. |
| 7,580,856 B1 | 8/2009 | Pliha |
| 7,581,112 B2 | 8/2009 | Brown et al. |
| 7,590,589 B2 | 9/2009 | Hoffberg |
| 7,593,889 B2 | 9/2009 | Raines et al. |
| 7,596,512 B1 | 9/2009 | Raines et al. |
| 7,610,216 B1 | 10/2009 | May et al. |
| 7,610,257 B1 | 10/2009 | Abrahams |
| 7,620,596 B2 | 11/2009 | Knudson et al. |
| 7,623,844 B2 | 11/2009 | Herrmann et al. |
| 7,647,274 B2 | 1/2010 | Peterson et al. |
| 7,653,592 B1 | 1/2010 | Flaxman |
| 7,653,593 B2 | 1/2010 | Zarikian et al. |
| 7,668,769 B2 | 2/2010 | Baker et al. |
| 7,668,840 B2 | 2/2010 | Bayliss et al. |
| 7,672,865 B2 | 3/2010 | Kumar et al. |
| 7,690,032 B1 | 3/2010 | Peirce |
| 7,698,163 B2 | 4/2010 | Reed et al. |
| 7,698,214 B1 | 4/2010 | Lindgren |
| 7,707,059 B2 | 4/2010 | Reed et al. |
| 7,707,102 B2 | 4/2010 | Rothstein |
| 7,708,190 B2 | 5/2010 | Brandt et al. |
| 7,711,636 B2 | 5/2010 | Robida et al. |
| 7,725,300 B2 | 5/2010 | Pinto et al. |
| 7,734,523 B1 | 6/2010 | Cui et al. |
| 7,742,982 B2 | 6/2010 | Chaudhuri et al. |
| 7,747,559 B2 | 6/2010 | Leitner et al. |
| 7,761,379 B2 | 7/2010 | Zoldi et al. |
| 7,761,384 B2 | 7/2010 | Madhogarhia |
| 7,778,885 B1 | 8/2010 | Semprevivo et al. |
| 7,783,562 B1 | 8/2010 | Ellis |
| 7,801,811 B1 | 9/2010 | Merrell et al. |
| 7,802,104 B2 | 9/2010 | Dickinson |
| 7,805,345 B2 | 9/2010 | Abrahams et al. |
| 7,805,362 B1 | 9/2010 | Merrell et al. |
| 7,827,115 B2 | 11/2010 | Weller et al. |
| 7,848,987 B2 | 12/2010 | Haig |
| 7,849,004 B2 | 12/2010 | Choudhuri et al. |
| 7,853,518 B2 | 12/2010 | Cagan |
| 7,856,397 B2 | 12/2010 | Whipple et al. |
| 7,856,494 B2 | 12/2010 | Kulkarni |
| 7,860,786 B2 | 12/2010 | Blackburn et al. |
| 7,904,306 B2 | 3/2011 | Johnson et al. |
| 7,941,363 B2 | 5/2011 | Tanaka et al. |
| 7,954,698 B1 | 6/2011 | Pliha |
| 7,962,404 B1 | 6/2011 | Metzger, II et al. |
| 7,991,689 B1 | 8/2011 | Brunzell et al. |
| 8,036,979 B1 | 10/2011 | Torrez et al. |
| 8,060,424 B2 | 11/2011 | Kasower |
| 8,065,234 B2 | 11/2011 | Liao et al. |
| 8,078,524 B2 | 12/2011 | Crawford et al. |
| 8,082,202 B2 | 12/2011 | Weiss |
| 8,214,262 B1 | 7/2012 | Semprevivo et al. |
| 2001/0014868 A1* | 8/2001 | Herz et al. ............... 705/14 |
| 2001/0029482 A1 | 10/2001 | Tealdi et al. |
| 2001/0032158 A1* | 10/2001 | Starkman ............... 705/36 |
| 2001/0034618 A1 | 10/2001 | Kessler et al. |
| 2001/0037332 A1 | 11/2001 | Miller et al. |
| 2001/0039523 A1 | 11/2001 | Iwamoto |
| 2001/0049620 A1 | 12/2001 | Blasko |
| 2002/0010594 A1 | 1/2002 | Levine |
| 2002/0133503 A1 | 1/2002 | Levine |
| 2002/0023051 A1 | 2/2002 | Kunzle et al. |
| 2002/0052841 A1* | 5/2002 | Guthrie et al. ............... 705/40 |
| 2002/0055869 A1 | 5/2002 | Hegg |
| 2002/0069155 A1* | 6/2002 | Nafeh et al. ............... 705/37 |
| 2002/0072975 A1 | 6/2002 | Steele et al. |
| 2002/0077964 A1 | 6/2002 | Brody et al. |
| 2002/0087460 A1 | 7/2002 | Hornung |
| 2002/0099628 A1 | 7/2002 | Takaoka et al. |
| 2002/0099641 A1 | 7/2002 | Mills et al. |
| 2002/0099649 A1 | 7/2002 | Lee et al. |
| 2002/0107849 A1 | 8/2002 | Hickey et al. |
| 2002/0119824 A1* | 8/2002 | Allen ............... 463/42 |
| 2002/0128960 A1 | 9/2002 | Lambiotte et al. |
| 2002/0138297 A1 | 9/2002 | Lee |
| 2002/0147617 A1 | 10/2002 | Schoenbaum et al. |
| 2002/0147669 A1 | 10/2002 | Taylor et al. |
| 2002/0147695 A1 | 10/2002 | Khedkar et al. |
| 2002/0156676 A1* | 10/2002 | Ahrens et al. ............... 705/14 |
| 2002/0161711 A1 | 10/2002 | Sartor et al. |
| 2002/0173984 A1 | 11/2002 | Robertson et al. |
| 2002/0184054 A1 | 12/2002 | Cox et al. |
| 2002/0184255 A1 | 12/2002 | Edd et al. |
| 2002/0188478 A1 | 12/2002 | Breeland et al. |
| 2002/0194103 A1 | 12/2002 | Nabe |
| 2002/0194120 A1 | 12/2002 | Russell et al. |
| 2003/0009426 A1 | 1/2003 | Ruiz-Sanchez |
| 2003/0018549 A1 | 1/2003 | Fei et al. |
| 2003/0028402 A1 | 2/2003 | Ulrich et al. |
| 2003/0033242 A1 | 2/2003 | Lynch et al. |
| 2003/0036947 A1 | 2/2003 | Starkey et al. |
| 2003/0036996 A1 | 2/2003 | Lazerson |
| 2003/0037054 A1 | 2/2003 | Dutta et al. |
| 2003/0046112 A1 | 3/2003 | Dutta et al. |
| 2003/0046223 A1 | 3/2003 | Crawford et al. |
| 2003/0050795 A1 | 3/2003 | Baldwin, Jr. et al. |
| 2003/0050796 A1 | 3/2003 | Baldwin, Jr. et al. |
| 2003/0050882 A1 | 3/2003 | Degen et al. |
| 2003/0061163 A1 | 3/2003 | Durfield |
| 2003/0065563 A1 | 4/2003 | Elliott et al. |
| 2003/0078877 A1 | 4/2003 | Beirne et al. |
| 2003/0097320 A1 | 5/2003 | Gordon |
| 2003/0097329 A1 | 5/2003 | Nabe et al. |

| | | |
|---|---|---|
| 2003/0097380 A1 | 5/2003 | Mulhern et al. |
| 2003/0105728 A1 | 6/2003 | Yano et al. |
| 2003/0110111 A1 | 6/2003 | Nalebuff et al. |
| 2003/0115133 A1 | 6/2003 | Bian |
| 2003/0158751 A1 | 8/2003 | Suresh et al. |
| 2003/0171942 A1 | 9/2003 | Gaito |
| 2003/0182214 A1 | 9/2003 | Taylor |
| 2003/0187768 A1 | 10/2003 | Ryan et al. |
| 2003/0195830 A1 | 10/2003 | Merkoulovitch et al. |
| 2003/0195859 A1 | 10/2003 | Lawrence |
| 2003/0208412 A1 | 11/2003 | Hillestad et al. |
| 2003/0212618 A1 | 11/2003 | Keyes et al. |
| 2003/0212654 A1 | 11/2003 | Harper et al. |
| 2003/0216965 A1 | 11/2003 | Libman |
| 2003/0217003 A1 | 11/2003 | Weinflash et al. |
| 2003/0225692 A1 | 12/2003 | Bosch et al. |
| 2003/0229507 A1 | 12/2003 | Perge |
| 2003/0233259 A1 | 12/2003 | Mistretta et al. |
| 2003/0233323 A1 | 12/2003 | Bilski et al. |
| 2004/0010443 A1 | 1/2004 | May et al. |
| 2004/0030667 A1 | 2/2004 | Xu et al. |
| 2004/0039686 A1 | 2/2004 | Klebanoff |
| 2004/0039688 A1 | 2/2004 | Sulkowski et al. |
| 2004/0044563 A1 | 3/2004 | Stein |
| 2004/0044615 A1 | 3/2004 | Xue et al. |
| 2004/0044617 A1 | 3/2004 | Lu |
| 2004/0049472 A1 | 3/2004 | Hayashi et al. |
| 2004/0049473 A1 | 3/2004 | Gower et al. |
| 2004/0054619 A1 | 3/2004 | Watson et al. |
| 2004/0064401 A1 | 4/2004 | Palaghita et al. |
| 2004/0064402 A1 | 4/2004 | Dreyer et al. |
| 2004/0073456 A1 | 4/2004 | Gottlieb et al. |
| 2004/0078324 A1* | 4/2004 | Lonnberg et al. ............... 705/39 |
| 2004/0107125 A1 | 6/2004 | Guheen et al. |
| 2004/0111305 A1* | 6/2004 | Gavan et al. ..................... 705/7 |
| 2004/0111363 A1 | 6/2004 | Trench et al. |
| 2004/0117235 A1* | 6/2004 | Shacham ........................ 705/10 |
| 2004/0122735 A1 | 6/2004 | Meshkin |
| 2004/0128150 A1 | 7/2004 | Lundegren |
| 2004/0128229 A1 | 7/2004 | Raines et al. |
| 2004/0153448 A1 | 8/2004 | Cheng et al. |
| 2004/0158520 A1 | 8/2004 | Noh |
| 2004/0158523 A1* | 8/2004 | Dort ................................ 705/42 |
| 2004/0163101 A1 | 8/2004 | Swix |
| 2004/0167793 A1 | 8/2004 | Masuoka et al. |
| 2004/0177030 A1 | 9/2004 | Shoham |
| 2004/0177046 A1 | 9/2004 | Ogram |
| 2004/0193535 A1 | 9/2004 | Barazesh |
| 2004/0199462 A1* | 10/2004 | Starrs ............................. 705/39 |
| 2004/0205157 A1 | 10/2004 | Bibelnieks et al. |
| 2004/0215553 A1 | 10/2004 | Gang et al. |
| 2004/0215554 A1 | 10/2004 | Kemper et al. |
| 2004/0215555 A1 | 10/2004 | Kemper et al. |
| 2004/0215556 A1 | 10/2004 | Merkley, Jr. et al. |
| 2004/0220896 A1 | 11/2004 | Finlay et al. |
| 2004/0225594 A1 | 11/2004 | Nolan, III et al. |
| 2004/0225596 A1 | 11/2004 | Kemper et al. |
| 2004/0225597 A1 | 11/2004 | Oppenheimer et al. |
| 2004/0230448 A1 | 11/2004 | Schaich |
| 2004/0230527 A1 | 11/2004 | Hansen et al. |
| 2004/0230534 A1 | 11/2004 | McGough |
| 2004/0243518 A1 | 12/2004 | Clifton et al. |
| 2004/0243588 A1 | 12/2004 | Tanner et al. |
| 2004/0267660 A1 | 12/2004 | Greenwood et al. |
| 2005/0004805 A1 | 1/2005 | Srinivasan |
| 2005/0021476 A1 | 1/2005 | Candella et al. |
| 2005/0027632 A1 | 2/2005 | Zeitoun et al. |
| 2005/0027633 A1 | 2/2005 | Fortuna et al. |
| 2005/0027983 A1 | 2/2005 | Klawon |
| 2005/0038726 A1 | 2/2005 | Salomon et al. |
| 2005/0058262 A1 | 3/2005 | Timmins et al. |
| 2005/0065874 A1 | 3/2005 | Lefner et al. |
| 2005/0086071 A1 | 4/2005 | Fox, Jr. et al. |
| 2005/0086072 A1 | 4/2005 | Fox, Jr. et al. |
| 2005/0086579 A1 | 4/2005 | Leitner et al. |
| 2005/0097051 A1 | 5/2005 | Madill, Jr. et al. |
| 2005/0102206 A1 | 5/2005 | Savasoglu et al. |
| 2005/0102226 A1 | 5/2005 | Oppenheimer et al. |
| 2005/0125350 A1 | 6/2005 | Tidwell et al. |
| 2005/0130704 A1 | 6/2005 | McParland et al. |
| 2005/0137912 A1 | 6/2005 | Rao et al. |
| 2005/0144067 A1 | 6/2005 | Farahat et al. |
| 2005/0154664 A1 | 7/2005 | Guy et al. |
| 2005/0154665 A1 | 7/2005 | Kerr |
| 2005/0187860 A1 | 8/2005 | Peterson et al. |
| 2005/0197953 A1 | 9/2005 | Broadbent et al. |
| 2005/0197954 A1 | 9/2005 | Maitland et al. |
| 2005/0209880 A1 | 9/2005 | Drelicharz et al. |
| 2005/0209892 A1 | 9/2005 | Miller |
| 2005/0209922 A1 | 9/2005 | Hofmeister |
| 2005/0228748 A1 | 10/2005 | Togher et al. |
| 2005/0251474 A1* | 11/2005 | Shinn et al. ..................... 705/39 |
| 2005/0251820 A1 | 11/2005 | Stefanik et al. |
| 2005/0256809 A1 | 11/2005 | Sadri |
| 2005/0273442 A1 | 12/2005 | Bennett et al. |
| 2005/0278246 A1 | 12/2005 | Friedman et al. |
| 2005/0278542 A1 | 12/2005 | Pierson et al. |
| 2005/0279824 A1 | 12/2005 | Anderson et al. |
| 2005/0279827 A1* | 12/2005 | Mascavage et al. .......... 235/380 |
| 2005/0288954 A1 | 12/2005 | McCarthy et al. |
| 2006/0004731 A1 | 1/2006 | Seibel et al. |
| 2006/0014129 A1* | 1/2006 | Coleman et al. ............... 434/322 |
| 2006/0031158 A1 | 2/2006 | Orman |
| 2006/0041443 A1 | 2/2006 | Horvath |
| 2006/0041464 A1 | 2/2006 | Powers et al. |
| 2006/0059073 A1 | 3/2006 | Walzak |
| 2006/0059110 A1 | 3/2006 | Madhok et al. |
| 2006/0074986 A1 | 4/2006 | Mallalieu et al. |
| 2006/0080139 A1 | 4/2006 | Mainzer |
| 2006/0080230 A1 | 4/2006 | Freiberg |
| 2006/0080233 A1 | 4/2006 | Mendelovich et al. |
| 2006/0080251 A1 | 4/2006 | Fried et al. |
| 2006/0080263 A1 | 4/2006 | Willis et al. |
| 2006/0089842 A1 | 4/2006 | Medawar |
| 2006/0100954 A1 | 5/2006 | Schoen |
| 2006/0106670 A1 | 5/2006 | Cai et al. |
| 2006/0129428 A1 | 6/2006 | Wennberg |
| 2006/0129481 A1 | 6/2006 | Bhatt et al. |
| 2006/0131390 A1 | 6/2006 | Kim |
| 2006/0155639 A1 | 7/2006 | Lynch et al. |
| 2006/0161435 A1 | 7/2006 | Atef et al. |
| 2006/0173772 A1 | 8/2006 | Hayes et al. |
| 2006/0173776 A1 | 8/2006 | Shalley et al. |
| 2006/0177226 A1* | 8/2006 | Ellis, III ........................ 398/116 |
| 2006/0178971 A1 | 8/2006 | Owen et al. |
| 2006/0178983 A1 | 8/2006 | Nice et al. |
| 2006/0200396 A1 | 9/2006 | Satterfield et al. |
| 2006/0202012 A1* | 9/2006 | Grano et al. ................... 235/379 |
| 2006/0204051 A1 | 9/2006 | Holland, IV |
| 2006/0229961 A1* | 10/2006 | Lyftogt et al. .................. 705/35 |
| 2006/0235743 A1 | 10/2006 | Long et al. |
| 2006/0239512 A1 | 10/2006 | Petrillo |
| 2006/0242039 A1 | 10/2006 | Haggerty et al. |
| 2006/0242046 A1* | 10/2006 | Haggerty et al. ............... 705/35 |
| 2006/0242049 A1 | 10/2006 | Haggerty et al. |
| 2006/0242050 A1 | 10/2006 | Haggerty et al. |
| 2006/0242051 A1 | 10/2006 | Haggerty et al. |
| 2006/0253358 A1 | 11/2006 | Delgrosso et al. |
| 2006/0262929 A1 | 11/2006 | Vatanen et al. |
| 2006/0265243 A1 | 11/2006 | Racho et al. |
| 2006/0271456 A1 | 11/2006 | Romain et al. |
| 2006/0271457 A1* | 11/2006 | Romain et al. .................. 705/35 |
| 2006/0282359 A1 | 12/2006 | Nobili et al. |
| 2006/0293921 A1 | 12/2006 | McCarthy et al. |
| 2007/0005508 A1 | 1/2007 | Chiang |
| 2007/0011039 A1 | 1/2007 | Oddo |
| 2007/0016500 A1* | 1/2007 | Chatterji et al. ................ 705/35 |
| 2007/0016520 A1 | 1/2007 | Gang et al. |
| 2007/0016522 A1 | 1/2007 | Wang |
| 2007/0038483 A1 | 2/2007 | Wood |
| 2007/0059442 A1 | 3/2007 | Sabeta |
| 2007/0067207 A1* | 3/2007 | Haggerty et al. ............... 705/10 |
| 2007/0067297 A1* | 3/2007 | Kublickis ........................ 707/9 |
| 2007/0072190 A1 | 3/2007 | Aggarwal |
| 2007/0078985 A1 | 4/2007 | Shao et al. |
| 2007/0083460 A1* | 4/2007 | Bachenheimer ................ 705/38 |
| 2007/0093234 A1 | 4/2007 | Willis et al. |
| 2007/0094137 A1* | 4/2007 | Phillips et al. .................. 705/40 |

| | | | | | | |
|---|---|---|---|---|---|---|
| 2007/0100719 A1* | 5/2007 | Chwast et al. ........... 705/35 | | 2009/0222376 A1 | 9/2009 | Choudhuri et al. |
| 2007/0106582 A1* | 5/2007 | Baker et al. ........... 705/35 | | 2009/0222377 A1 | 9/2009 | Choudhuri et al. |
| 2007/0112667 A1 | 5/2007 | Rucker | | 2009/0222378 A1 | 9/2009 | Choudhuri et al. |
| 2007/0112668 A1 | 5/2007 | Celano et al. | | 2009/0222379 A1 | 9/2009 | Choudhuri et al. |
| 2007/0118410 A1 | 5/2007 | Nadai | | 2009/0222380 A1 | 9/2009 | Choudhuri et al. |
| 2007/0192165 A1 | 8/2007 | Haggerty et al. | | 2009/0248567 A1 | 10/2009 | Haggerty et al. |
| 2007/0192248 A1 | 8/2007 | West | | 2009/0248568 A1 | 10/2009 | Haggerty et al. |
| 2007/0198336 A1 | 8/2007 | Thompson | | 2009/0248569 A1 | 10/2009 | Haggerty et al. |
| 2007/0198407 A1 | 8/2007 | Winter | | 2009/0248570 A1 | 10/2009 | Haggerty et al. |
| 2007/0205266 A1 | 9/2007 | Carr et al. | | 2009/0248571 A1 | 10/2009 | Haggerty et al. |
| 2007/0214076 A1 | 9/2007 | Robida et al. | | 2009/0248572 A1 | 10/2009 | Haggerty et al. |
| 2007/0226047 A1 | 9/2007 | Ward | | 2009/0248573 A1 | 10/2009 | Haggert et al. |
| 2007/0226093 A1 | 9/2007 | Chan et al. | | 2009/0254476 A1 | 10/2009 | Sharma et al. |
| 2007/0226130 A1 | 9/2007 | Haggerty et al. | | 2009/0276244 A1 | 11/2009 | Baldwin, Jr. et al. |
| 2007/0244732 A1 | 10/2007 | Chatterji et al. | | 2009/0307778 A1 | 12/2009 | Mardikar |
| 2007/0244807 A1 | 10/2007 | Andringa et al. | | 2010/0009320 A1 | 1/2010 | Wilkelis |
| 2007/0255654 A1 | 11/2007 | Whipple et al. | | 2010/0023448 A1 | 1/2010 | Eze |
| 2007/0255655 A1 | 11/2007 | Kemper et al. | | 2010/0043055 A1 | 2/2010 | Baumgart |
| 2007/0258626 A1 | 11/2007 | Reiner | | 2010/0094768 A1 | 4/2010 | Miltonberger |
| 2007/0279187 A1 | 12/2007 | Hekmatpour et al. | | 2010/0100945 A1 | 4/2010 | Ozzie et al. |
| 2007/0288271 A1 | 12/2007 | Klinkhammer | | 2010/0114744 A1 | 5/2010 | Gonen |
| 2007/0288355 A1 | 12/2007 | Roland et al. | | 2010/0130172 A1 | 5/2010 | Vendrow et al. |
| 2007/0299699 A1 | 12/2007 | Policelli et al. | | 2010/0142698 A1 | 6/2010 | Spottiswoode et al. |
| 2008/0010687 A1 | 1/2008 | Gonen et al. | | 2010/0145836 A1 | 6/2010 | Baker et al. |
| 2008/0015979 A1 | 1/2008 | Bentley | | 2010/0145847 A1 | 6/2010 | Zarikian et al. |
| 2008/0021802 A1 | 1/2008 | Pendleton | | 2010/0205662 A1 | 8/2010 | Ibrahim et al. |
| 2008/0046351 A1 | 2/2008 | Wiener et al. | | 2010/0229245 A1 | 9/2010 | Singhal |
| 2008/0052182 A1* | 2/2008 | Marshall ............ 705/26 | | 2010/0299262 A1 | 11/2010 | Handler |
| 2008/0059317 A1 | 3/2008 | Chandran et al. | | 2011/0004498 A1 | 1/2011 | Readshaw |
| 2008/0059352 A1 | 3/2008 | Chandran | | 2011/0047071 A1 | 2/2011 | Choudhuri et al. |
| 2008/0065569 A1 | 3/2008 | Dutt et al. | | 2011/0071950 A1 | 3/2011 | Ivanovic |
| 2008/0066188 A1 | 3/2008 | Kwak | | 2011/0093383 A1 | 4/2011 | Haggerty et al. |
| 2008/0077526 A1 | 3/2008 | Arumugam | | 2011/0112958 A1 | 5/2011 | Haggerty et al. |
| 2008/0086400 A1 | 4/2008 | Ardelean et al. | | 2011/0173116 A1 | 7/2011 | Yan et al. |
| 2008/0091519 A1 | 4/2008 | Foss | | 2011/0213641 A1 | 9/2011 | Metzger, II et al. |
| 2008/0097768 A1 | 4/2008 | Godshalk | | 2011/0218826 A1 | 9/2011 | Birtel et al. |
| 2008/0103800 A1 | 5/2008 | Domenikos et al. | | 2011/0270779 A1 | 11/2011 | Showalter |
| 2008/0103972 A1* | 5/2008 | Lanc ............ 705/44 | | 2012/0047219 A1 | 2/2012 | Feng et al. |
| 2008/0109315 A1 | 5/2008 | Huang et al. | | 2012/0095927 A1 | 4/2012 | Hirtenstein et al. |
| 2008/0120133 A1 | 5/2008 | Krishnaswami et al. | | 2012/0116950 A1 | 5/2012 | Torrez et al. |
| 2008/0120155 A1 | 5/2008 | Pliha | | 2012/0158574 A1 | 6/2012 | Brunzell et al. |
| 2008/0126233 A1 | 5/2008 | Hogan | | 2012/0158575 A1 | 6/2012 | Chaudhuri et al. |
| 2008/0133278 A1 | 6/2008 | Stanfield | | | | |
| 2008/0147454 A1 | 6/2008 | Walker et al. | | FOREIGN PATENT DOCUMENTS | | |
| 2008/0167883 A1 | 7/2008 | Khazaneh | | EP | 0 554 083 | 8/1993 |
| 2008/0172324 A1 | 7/2008 | Johnson | | EP | 0 559 358 | 9/1993 |
| 2008/0175360 A1 | 7/2008 | Schwarz et al. | | EP | 0 977 128 | 2/2000 |
| 2008/0189202 A1 | 8/2008 | Zadoorian et al. | | EP | 1 122 664 | 8/2001 |
| 2008/0208610 A1* | 8/2008 | Thomas et al. ........... 705/1 | | EP | 0 772 836 | 12/2001 |
| 2008/0221972 A1 | 9/2008 | Megdal | | GB | 2 384 087 A | 7/2003 |
| 2008/0222027 A1 | 9/2008 | Megdal et al. | | GB | 2 392 748 A | 3/2004 |
| 2008/0228635 A1 | 9/2008 | Megdal et al. | | JP | 10-222559 | 8/1998 |
| 2008/0243680 A1 | 10/2008 | Megdal et al. | | JP | 10-261009 | 9/1998 |
| 2008/0255897 A1 | 10/2008 | Megdal et al. | | JP | 2000-331068 | 11/2000 |
| 2008/0255992 A1 | 10/2008 | Lin | | JP | 2001-297141 | 10/2001 |
| 2008/0270209 A1 | 10/2008 | Mauseth et al. | | JP | 2001-344463 | 12/2001 |
| 2008/0270294 A1 | 10/2008 | Lent et al. | | JP | 2001-357256 | 12/2001 |
| 2008/0270295 A1 | 10/2008 | Lent et al. | | JP | 2002-149778 | 5/2002 |
| 2008/0281737 A1 | 11/2008 | Fajardo | | JP | 2002-163498 | 6/2002 |
| 2008/0288283 A1 | 11/2008 | Baldwin, Jr. et al. | | JP | 2002-259753 | 9/2002 |
| 2008/0288382 A1 | 11/2008 | Smith et al. | | JP | 2003-016261 | 1/2003 |
| 2008/0294501 A1 | 11/2008 | Rennich et al. | | JP | 2003-271851 | 9/2003 |
| 2008/0294540 A1 | 11/2008 | Celka et al. | | JP | 2003-316881 | 11/2003 |
| 2008/0301016 A1 | 12/2008 | Durvasula et al. | | KR | 10-2000-0036594 | 7/2000 |
| 2009/0018996 A1 | 1/2009 | Hunt et al. | | KR | 10-2000-0063995 | 11/2000 |
| 2009/0024505 A1 | 1/2009 | Patel et al. | | KR | 10-2001-0016349 | 3/2001 |
| 2009/0044279 A1 | 2/2009 | Crawford et al. | | KR | 10-2001-0035145 | 5/2001 |
| 2009/0106150 A1 | 4/2009 | Pelegero et al. | | KR | 10-2002-0007132 | 1/2002 |
| 2009/0106846 A1 | 4/2009 | Dupray et al. | | TW | 256569 | 6/2006 |
| 2009/0112650 A1 | 4/2009 | Iwane | | WO | WO 94/06103 | 3/1994 |
| 2009/0125369 A1 | 5/2009 | Kloostra et al. | | WO | WO 94/12943 | 6/1994 |
| 2009/0126013 A1 | 5/2009 | Atwood et al. | | WO | WO 95/12857 | 5/1995 |
| 2009/0172815 A1* | 7/2009 | Gu et al. ........... 726/23 | | WO | WO 95/34155 | 12/1995 |
| 2009/0182653 A1 | 7/2009 | Zimiles | | WO | WO 96/00945 | 1/1996 |
| 2009/0199264 A1 | 8/2009 | Lang | | WO | WO 97/23838 | 7/1997 |
| 2009/0222308 A1 | 9/2009 | Zoldi et al. | | WO | WO 98/41931 | 9/1998 |
| 2009/0222373 A1 | 9/2009 | Choudhuri et al. | | WO | WO 98/41932 | 9/1998 |
| 2009/0222374 A1 | 9/2009 | Choudhuri et al. | | WO | WO 98/41933 | 9/1998 |
| 2009/0222375 A1 | 9/2009 | Choudhuri et al. | | WO | WO 99/04350 | 1/1999 |

| | | |
|---|---|---|
| WO | WO 99/17225 | 4/1999 |
| WO | WO 99/17226 | 4/1999 |
| WO | WO 99/22328 | 5/1999 |
| WO | WO 99/38094 | 7/1999 |
| WO | WO 99/46710 | 9/1999 |
| WO | WO 00/04465 | 1/2000 |
| WO | WO 00/28441 | 5/2000 |
| WO | WO 00/55789 | 9/2000 |
| WO | WO 00/55790 | 9/2000 |
| WO | WO 01/04821 | 1/2001 |
| WO | WO 01/11522 | 2/2001 |
| WO | WO 01/41355 | 6/2001 |
| WO | WO 01/75754 | 10/2001 |
| WO | WO 02/13047 | 2/2002 |
| WO | WO 02/27610 | 4/2002 |
| WO | WO 03/071388 | 8/2003 |
| WO | WO 03/101123 | 12/2003 |
| WO | WO 2004/046882 A2 | 6/2004 |
| WO | WO 2004/114160 | 12/2004 |
| WO | WO 2007/149941 | 12/2007 |
| WO | WO 2008/021061 | 2/2008 |
| WO | WO 2010/062537 | 6/2010 |

OTHER PUBLICATIONS

U.S. Appl. No. 12/705,511, filed Feb. 12, 2010, Bargoli et al.
Bult, Jan Roelf et al., Optimal Selection for Direct Mail, Marketing Science, vol. 14, No. 4 (1995), p. 378-94.
Card Marketing, Use the Latest CRM Tools and Techniques, www.CardForum.com, vol. 5 No. 10, Dec. 2001.
Cowie, Norman E., Warning Bells & "The Bust-Out", Business Credit, Jul. 1, 2000.
Custom Strategist and Qualifile, Jun. 2000.
Downes, et al., Dictionary of Finance and Investment Terms, Fifth Edition, pp. 332-333, 1998.
eFunds Corporation, Data & Decisioning, Debit Report, Apr. 1, 2007, http://www.efunds.com/web/industry-solutions/financial-services/frm-debit-report/htm.
eFunds Introduces QualifFle, 1999. †
Fair Isaac Introduces Falcon One System to Combat Fraud, Business Wire, May 5, 2005.
Fair Isaac Offers New Fraud Tool, National Mortgage News & Source Media, Inc., Jun. 13, 2005.
FinExtra, Basepoint Analytics Introduces Predictive Technology for Mortgage Fraud, May 10, 2005.
GR Bitran, SV Mondschein—Management Science, 1996—JSTOR Mailing Decisions in the Catalog Sales Industry, Gabriel R. Bitran, Susana V. Mondschein. Management Sciencem vol. 42, No. 9, 1364-81, Sep. 1996.
Hakan Polatoglu et al., European Journal of Operational Research, Theory and Methodology, Probability distributions of cost, revenue and profit over a warranty cycle, Dec. 1996.
Hakan Polatoglua and Izzet Sahinb, Probability distributions of cost, revenue and profit over a warranty cycle, European Journal of Operational Research, vol. 108, Issue 1. Jul. 1, 1998, p. 170-83.
Haughton, Dominique et al., Direct Marketing Modeling with CART and CHAID, Journal of Direct Marketing, vol. 11, Iss. 4, 1997, p. 42-52. †
Industry News, New Technology Identifies Mortgage Fraud: Basepoint Analytics Launches FraudMark, Inman News, Oct. 5, 2005, American Land Title Association.
International Preliminary Report on Patentability and Written Opinion, PCT/US2008/064594, dated Oct. 8, 2008.
International Search Report and Written Opinion for PCT/US2007/63822, Sep. 11, 2007.
International Search Report and Written Opinion for PCT/US2007/63823, Oct. 24, 2007.
International Search Report and Written Opinion for PCT/US2007/63824, Oct. 9, 2007.
International Search Report for PCT/US2007/06070, Nov. 10, 2008.
Katy Jacob et al., The Center for Financial Services Innovation, A Case Study of Checking Account Inquiries and Closures in Chicago, Nov. 2006.
Klein, "A Constant-Utility Index of the Cost of Living", The Review of Economic Studies, 1960, pp. 84-87, vol. XV-XVI, Kraus Reprint Corporation, New York. †
LifeLock, "How LifeLock Works," http://www.lifelock.com/lifelock-for-people, accessed on Mar. 14, 2008.
LifeLock, "LifeLock Launches First ID Theft Prevention Program for the Protection of Children," Oct. 14, 2005 Press Release, posted on http://www.lifelock.com/about-us/press-room/2005-press-releases/lifelock-protection-for-children, accessed on Mar. 14, 2008.
LifeLock; "How can LifeLock protect my kids and family?," http//www.lifelock.com/lifelock-for-people/how-we-do-it/how-can-lifelock-protect-my-kids-and-family, accessed on Mar. 14, 2008.
RAP Interactive, Inc. and Web Decisions: Proudly Presents Live Decisions, A Powerful New Information and Technology Resource that Revolutionizes Interactive Marketing, downloaded from www.webdecisions.com/pdf/LiveDecisions_Bro.pdf, 2 pgs.
Schmittlein, David C. et al., Customer Base Analysis: An Industrial Purchase Process Application, Marketing Science, vol. 13, No. 1 (Winter 1994), p. 41-67.
Service Objects: Insight on Demand, Instant Contact Analysis and Lead Verification Solutions, DOTS Web Services—Product Directory, downloaded from www.serviceobjects.com/products/directory_of_web_services.asp, printed Apr. 1, 2009 in 4 pages.
Smith, Wendell R., "Product Differentiation and Market Segmentation as Alternative Marketing Strategies", The Journal of Marketing, Jul. 1956, pp. 3-8, vol. XXI, The American Marketing Association, Brattleboro, Vermont, U.S.A.
Stone, "Linear Expenditure Systems and Demand Analysis: An Application to the Pattern of British Demand", The Economic Journal: The Journal of the Royal Economic Society, 1954, pp. 511-527, vol. LXIV, Macmillan & Co., London.
Tackling the Issue of Bust-Out Fraud, Retail Banker International, Jul. 24, 2007.
Truston, "Checking if your child is an ID theft victim can be stressful," as posted by Michelle Pastor on Jan. 22, 2007 at http://www.mytruston.com/blog/credit/checking_if_your_child_is_an_id_theft_vi.html.
W.A. Lee, American Banker: The Financial Services Daily, Experian, On Deal Hunt, Nets Identity Theft Insurer, Jun. 4, 2003.
Working, Holbrook, "Statistical Laws of Family Expenditure", Journal of the American Statistical Association, 1943, pp. 43-56, vol. 38, American Statistical Association, Washington, D.C.
Webpage printed from <http://www.magnum.net/pdfs/RapUpBrochure.pdf>, on Mar. 4, 2008.
Zoot's Decision Engine, www.zootweb.com/decision_engine.html.
Zoot's Instant Rules GUI, www.zootweb.com/instant_rules_GUI.html.
Zoot's Pre-Built Standard Attributes, www.zootweb.com/credit_attributes.html.
Zoot's Rules Management GUI, www.zootweb.com/business_rules_GUI.html.
"ACS Company Birch & Davis Wins Texas CHIP Contract," PR Newswire, Section: Financial News, 3 pgs., Dallas, TX, May 17, 2000.
"An Even Better Solution to Financing Elective Surgery . . . ", Unicorn Financial, pp. 7, http://web.archive.org/web/20000816161359/http://www.unicornfinancial.com/ as downloaded Oct. 15, 2008.
"Authorizing Safety Net Public Health Programs," Hearing before the Subcommittee on Health of the Committee on Energy and Commerce, House of Respresentatives, One Hundred Seventh Congress, First Session, Serial No. 107-57, dated Aug. 1, 2001, 226 pgs.,
"Birch & Davis Wins Texas CHIP Contract," Birch & Davis Press Release, dated Jan. 4, 2000, 3 pgs., as downloaded from http://web.archive.org/web/20010304065515/www.birchdavis.com/txchip.htm (1 of 3) [Oct. 20, 2008 9:49:18 AM].
"Financing Medical Procedures a Lucrative but Risky Business," Credit Risk Management Report, vol. 10, Issue 15, 2 pgs., dated Aug. 7, 2000.
"Improving the Implementation of State Children's Health Insurance Programs for Adolescents Report of an Invitational Conference Sponsored by the American Academy of Pediatrics, Section on Adolescent Health," Pediatrics, Official Journal of the American A.

"MediCredit Announces Major Investment from Medstone; Financing Will Enable Dramatic Expansion of Online Services," Business Wire, pp. 2, dated May 12, 2000.
"Web Site Fuels Elective Surgery Trend; The Complete Resource to Paying for Cosmetic Surgery, Laser Vision Correction and Cosmetic Dentistry," Business Wire, 2 pgs, dated Apr. 7, 1999.
"Intelligent Miner Applications Guide"; Chapters 4-7; pp. 33-132; IBM Corp., Apr. 2, 1999.
"Japan's JAAI system appraises used cars over internet", Asia Pulse, Mar. 3, 2000.
"WashingtonPost.com and Cars.com launch comprehensive automotive web site for the Washington area". PR Newswire, Oct. 22, 1998.
An Expert System for Determining Medicaid Eligibility, Journal of Medical Systems, vol. 12, Nov. 5, 1988, in 10 pages.
Announcing TrueProfiler, http://web.archive.org/web/20021201123646/http://www.truecredit.com/index.asp, dated Dec. 1, 2002, 2 pages.
Barry, Ellen, "Life, Liberty, and the Pursuit of Lipo," The Boston Phoenix, News & Opinion, dated Apr. 6, 1998, as downloaded at http://weeklywire.com/ww/04-06-98/boston_feature_1.html (1 of 12) [Oct. 15, 2008 2:35:25 PM].
Belford, Terrence, "Technology Quarterly: Computers Internet speeds credit checks System tailored for doctors, dentists," The Globe and Mail (Canada), Section: Report on Business Special Reports, dated Mar. 18, 1997, 2 pgs.
Boss, Shira J. "Elective Surgery Without the Plastic: Low-Interest Medical Financing Provides Alternative to Credit Cards," factiva, Crain's New York Business, 2 pgs., dated Jun. 22, 1998.
Broward County CAP Grant Application, as printed on Aug. 10, 2009, 41 pgs.
Burr Ph.D., et al. , Utility Payments as Alternative Credit Data: A Reality Check, Asset Builders of America, Inc., Oct. 5, 2006, pp. 1-18, Washington, D.C.
Caliendo, et al., "Some Practical Guidance for the Implementation of Propensity Score Matching"; IZA: Discussion Paper Series; No. 1588; Germany; May 2005.
Calnan, Christopher, "Tenet, Fair Isaac invest $20M in startup," MHT, Mass High Tech: The Journal of New England Technology, dated Jul. 23, 2007, 2 pgs.
Capps et al., "Recent Changes in Texas Welfare and Work, Child Care and Child Welfare Systems," Assessing the New Federalism, The Urbane Institute, State Update No. 1, 24 pgs., Jun. 2001.
CAPStone Newsletter, Sep. 2001, 8 pgs., as downloaded from http://web.archive.org/web/20011213115738/www.capcommunity.hrsa.gov/Newsletter/Newsletter12.htm (1 of 8) [Oct. 18, 2008 2:39:47 PM].
Cheney, Karen, "Fix Your Nose, If You Wish, but Not With This New Loan," Money Magazine, vol. 27, No. 5, 1 pg., dated May 1, 1998.
Chores & Allowances. "Do Kids Have Credit Reports?" http://choresandallowances.blogspot.com/2007/10/do-kids-have-credit-reports.html. Oct. 15, 2007 as printed May 31, 2011.
DentalFinancing.com, "Financial services for patients and dental professionals,", 7 pgs., as downloaded from http://web.archive.org/web/20010607151954/www.dentalfinancing.com/dentist/index.asp (1 of 2) ]Oct. 15, 2008 3:55:16 PM].
Dietz, Ellen, "Dental Office Management," 8 pgs., pp. 316-321, Copyright 2000.
Electronic Privacy Information Center, "The Fair Credit Reporting Act" 15 USC 1681 (1992), 10 pgs., as downloaded from http://epic.org/privacy/financial/fcra.html on Mar. 19, 2008.
Ellwood, Marilyn, "The Medicaid Eligibility Maze: Coverage Expands, but Enrollment Problems Persist, Findings from a Five-State Study," Mathematica Policy Research, Inc., Occasional Paper No. 30, 56 pgs., Dec. 1999.
Elmasri et al., "Fundamentals of Database Systems, Third Edition (Excerpts)," pp. 253, 261, 268-70, 278-80, 585, 595, Jun. 2000.
Felsenthal, Edward, "Health Costs; Managed Care Helps Curb Costs, Study Says," The Wall Street Journal, dated Aug. 12, 1991.
Gibbs, Adrienne; "Protecting Your Children from Identity Theft," http://www.creditcards.com/credit-card-news/identity-ID-theft-and-kids-children-1282.php Nov. 25, 2008 as printed Jul. 5, 2011.
Gilje, Shelby, "Credit Agency Moving Into Health Care," NewsRoom, Seattle Times, WA, Section: SCENE, Dated Mar. 22, 1995, 3 pgs., as downloaded from http://web2.westlaw.com/result/documenttext.aspx?rs=WLW8.03&ss+CNT&rp=%2fWelc . . . on Mar. 19, 2008.
Goldstein, Jacob, "The Newest Vital Sign: Your Credit Score," The Wall Street Journal, Health Blog, as viewed at http://blogs.wsj.com/health/2008/03/18/the-newest-vital-sign-your-cr . . . , 3 pgs.
Henry, M.D., Kimberly A., "The Face-Lift Sourcebook," copyright 2000, 3 pgs. (p. 207).
ID Theft Assist, "Do You Know Where Your Child's Credit Is?" http://www.idtheftassist.com/pages/story14 Nov. 26, 2007, as printed May 31, 2011.
IndiCareTM, On-Line Patient Assistant Program, Website Users Manual, JBI Associates, LLC, 1997.
Kent, Heather, "Huge declines in price as competition heats up in Vancouver's booming laser-surgery market," CMAJ, Oct. 5, 1999; 161 (7), pp. 857-858.
Klein, et al., "An Econometric Model of the United States: 1929-1952", Amsterdam: North-Holland, 1955.
Klein, L.R; "The Keynesian Revolution", New York: MacMillan, 1947.
Lavelle, Marianne, "Health Plan Debate Turning to Privacy Some Call for Safeguards on Medical Disclosure. Is a Federal Law Necessary?," The National Law Journal, vol. 16, No. 39, dated May 30, 1994, as downloaded from http://web2.westlaw.com/result/.
Mathematica Policy Research, Inc., "1998 Health Care Survey of DoD Beneficiaries: Technical Manual," Jul. 1999.
McGovern, Celeste, Jayhawk Medical Acceptance. (Brief Article), Alberta Report, 1 pg., dated Aug. 23, 1999.
McLaughlin, Nancy H., "Homeless, pregnant and alone Dana Sides knows her baby is likely to come in a month, but she has no idea where she will go after leaving the hospital," NewsRoom, Greensboro News & Record (NC), Section: General News, dated Dec. 6, 2001.
MediCredit, Patient Financing, "Thought you couldn't afford Cosmetic Surgery?," 3 pgs., as downloaded from http://web.archive.org/web/19970601060333/http://www.medicreditcom/ (1 of 2) [Oct. 15, 2008 3:16:31 PM].
Miller, Joe, "NADA used-car prices go online". Automotive News, Jun. 14, 1999, p. 36.
NewsRoom, Insurance Regulator, State Survey, "CIGNA Report Withdrawn as Foe Sees Opening," Sep. 9, 1996, vol. 8, Issue 34, 4pgs, as downloaded at http://web2.westlaw.com/result/documenttext.aspx?rs=WLW8.03&ss=CNT&rp=%2fWelc . . . on Mar. 19, 2008.
Next Card: About Us; as download on Oct. 23, 2009 from http://web.cba.neu.edu/~awatson/NextCardCase/NextCardAboutUs.htm (Copyright 1997-2001); pp. 1-10.
Paustian, Chuck; "Every Cardholer a King Customers get the Full Treatment at Issuers' Web Sites"; Card Marketing; New York; vol. 5, Issue, 3; pp. 1-3; Mar. 2001.
Pennsylvania Law Weekly, "Discriminating Against Victims Admitting Domestic Abuse Can Lead to Denial of Insurance Coverage," vol. XVIII, No. 26, dated Jun. 26, 1996, 2 pgs., as downloaded from http://web2.westlaw.com/result/documenttext.aspx?rs=WLW8.
Rubin, Rita, "Cosmetic Surgery on Credit Finance plans let patients reconstruct now, pay later," The Dallas Morning News, 2 pgs., dated Sep. 10, 1988.
Sawyers, Arlene "NADA to offer residual guide". Automotive News, May 22, 2000, p. 3.
SearchAmerica, Solutions, "Payment Advisor Suite TM" 2008.
Selz, Michael, "Lenders Find Niche in Cosmetic Surgery That Isn't Insured—But Since You Can't Repossess a Nose Job, Risks Aren't Restricted to the Patients," Wall Street Journal, New York, N.Y., Jan. 1997, p. A.1, 3 pgs.
State of Wisconsin, Division of Health Care Financing, Department of Health and Family Services: 1999-2001 Biennial Report, Pages pp. 17-21.
Stein, Benchmarking Default Prediction Models: Pitfalls and Remedies in Model Validation, Moody's KMV, Revised Jun. 13, 2002, Technical Report #020305; New York.
Tao, Lixin, "Shifting Paradigms with the Application Service Provider Model"; Concordia University, Canada; IEEE; Oct. 2001.
Texas Department of Human Services, 1999 Annual Report, 60 Years of Progress, Medial Services 9P137, Publication No. DHS-600-FY99.

thatlook.com, Cosmetic Surgery Financing, 3 pgs, as downloaded from http://web.archive.org/web/200001214113900/www.thatlook.com/cosmetic_surger_financing.cfm (1 of 2) [Oct. 15, 2008 4:11:47 PM].

Thoemmes, Felix, "Propensity Score Matching in SPSS", Center for Educational Science and Psychology, University of Tubingen, Jan. 2012.

Thomas, David, "Report on Networks and Electronic Communications Newcourt Credit turns to extranet Services / A PC connects to 1,200 users at once." The Globe and Mail (Canada), Section: Report on Business Special Report, 2 pgs., dated Nov. 12, 1996.

Vamosi, Robert, "How to Handle ID Fraud's Youngest Victims," http://news.cnet.com/8301-10789_3-10105303-57.html Nov. 21, 2008 as printed May 31, 2011.

Washington State Office of Public Defense, "Criteria and Standards for Determining and Verifying Indigency," dated Feb. 9, 2001.

Window on State Government, Susan Combs, Texas Comptroller of Public Accounts, Chapter 8: Health and Human Services, "Improve the Medicaid Eligibility Determination Process," 9 pgs., as downloaded at http://www.window.state.tx.us/etexas2001/recommend/ch08.

Wisconsin Department of Workforce Development, BadgerCare Medicaid Application Credit Report Authorization Form, dated Jun. 21, 2001.

Wisconsin Department of Workforce Development, BadgerCare Medicaid Notification of Eligibility, dated Jul. 25, 2000.

* cited by examiner

US 8,364,588 B2

SYSTEM AND METHOD FOR AUTOMATED DETECTION OF NEVER-PAY DATA SETS

CROSS-REFERENCE TO RELATED APPLICATIONS

This application is a continuation of U.S. application Ser. No. 12/125,820, filed May 22, 2008 now abandoned, which claims the benefit of U.S. Provisional Application No. 60/931,902, titled METHODS AND SYSTEMS FOR MODELING NEVER-PAY POPULATION and filed on May 25, 2007. The foregoing applications are hereby incorporated by reference in their entirety, specifically the systems and methods for modeling and predicting fraud as disclosed therein.

BACKGROUND

1. Field of the Invention

This disclosure generally relates to data filters for modeling and processing credit report data and other data, and more particularly to improved systems and methods for generating and using data filters configured to conduct customer profiling and customer analysis relating to modeling, identifying, and/or predicting the never-pay population.

2. Description of the Related Art

Various financial service entities provide credit accounts, such as, for example, mortgages, automobile loans, credit card accounts, and the like, to consumers and or businesses. Prior to providing a credit account to an applicant, or during the servicing of such a credit account, many financial service providers want to know whether the applicant or customer will be or is likely to be within the "never-pay" population. The never-pay population includes without limitation those customers that make a request for credit, subsequently obtain the credit instrument, and over the life of the account, never make a payment or substantially never make a payment. Although the never-pay population is not always large (however, it can be a large population for certain financial firms, for example, those firms serving the sub-prime market or the like), it is a costly population to financial service providers and other entities. Most financial service providers can attribute a certain percentage of their losses to the never-pay population.

Traditional scoring models do not provide the necessary insight to identify the never-pay population. In part, this is due to the diversity of profiles that underlie these populations. Additionally, the attributes and/or reasons that contribute to the never-pay population are difficult to identify for some financial service providers because of their limited resources and the complexity of analyzing the never-pay population. Accordingly, these never-pay accounts are not identified early in the process, and are treated as typical credit loss and are often written off as bad debt.

SUMMARY

Never-pay data filters, models, and/or profiles can be generated and applied to both data for potential and actual customers (for example, individual consumers, businesses, or the like) to determine their propensity to never make a payment on a credit account.

In an embodiment, a never-pay automated detection system, the system comprising: a processor configure to run software modules; a data storage device storing a plurality of consumer records comprising credit bureau data, tradeline data, historical balance data, and demographic data, the data storage device in electronic communication with the computer system; and a never-pay module configured to: identify a subset of the plurality of consumer records from the data storage device; receive a first never-pay data profile from a storage repository, the first never-pay data profile identifying consumer records that are likely or substantially likely to never make a payment; apply the first never-pay data profile to each of the subset of the plurality of consumer records to generate a first never-pay score for each of the subset of the plurality of consumer records; and store in a database an aggregate never-pay score associated with the subset of the plurality of the consumer records, the aggregate never-pay score comprising at least the first never-pay score; the processor able to run the never-pay module.

In another embodiment, the never-pay module further configured to receive a second never-pay data profile from the storage repository, the second never-pay profile identifying consumer records that are likely or substantially likely to never make a payment, and apply the second never-pay profile to each of the subset of plurality of consumer records to generate a second never-pay score for each of the subset of plurality of consumer records to be included in the aggregate never-pay score. In an embodiment, the never-pay module further configured to receive a third never-pay data filter from the storage repository, the third never-pay profile identifying consumer records that are likely or substantially likely to never make a payment, and apply the third never-pay filter to each of the subset of plurality of consumer records to generate a third never pay score for each of the subset of plurality of consumer records to be included in the aggregate never-pay score.

In an embodiment, a computer implemented method for maintaining a database comprising: electronically identifying a plurality of consumer records, wherein the consumer records comprise credit bureau data, tradeline data, historical balance data, and demographic data; electronically receiving a first never-pay data filter from a storage repository; electronically applying the first never-pay data filter to each of the plurality consumer records to generate a first never pay score for each of the plurality of consumer records; and electronically storing in a database an aggregate never-pay score associated with each of the consumer records, the aggregate never-pay score comprising at least the first never-pay score.

In an embodiment, the computer implemented method further comprising electronically receiving a second never-pay data filter from the storage repository and electronically applying the second never-pay filter to each of the plurality of consumer records to generate a second never-pay score for each of the plurality of consumer records to be included in the aggregate never-pay score. In an embodiment, the computer implemented method further comprising electronically receiving a third never-pay data filter from the storage repository and electronically applying the third never-pay filter to each of the plurality of consumer records to generate a third never pay score for each of the plurality of consumer records to be included in the aggregate never-pay score.

In an embodiment, the never-pay automated detection system comprises a processor configured to run software modules; a data storage device storing a plurality of credit data records, the data storage device in communication with the processor; and a never-pay module configured to: identify records in the data storage device that are defined as never-pay records which are likely to indicate consumers that are likely or substantially likely never to make a payment; track the identified records over a time period; and develop a first never-pay data profile that predicts the propensity of a consumer to be a never-pay record using the tracked identified records, the processor able to run the never-pay module.

In an embodiment, a computer implemented method of developing a data filter for automatically identifying never-pay database records comprising: electronically identifying records of a database that are defined as never-pay records which are likely to indicate consumers that are likely or substantially likely never to make a payment; electronically tracking the identified records over a time period; and electronically developing a data filter that predicts the propensity of a consumer to be a never-pay record using the electronically tracked identified records.

For purposes of this summary, certain aspects, advantages, and novel features of the invention are described herein. It is to be understood that not necessarily all such aspects, advantages, and features may be employed and/or achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

BRIEF DESCRIPTION OF THE DRAWINGS

The foregoing and other features, aspects and advantages of the present invention are described in detail below with reference to the drawings of various embodiments, which are intended to illustrate and not to limit the invention. The drawings comprise the following figures in which:

FIG. 7 is flowchart diagram illustrating an embodiment for applying the aggregate never-pay score to determine whether to perform a business action or the like.

DESCRIPTION OF THE EMBODIMENTS

Figure 1:
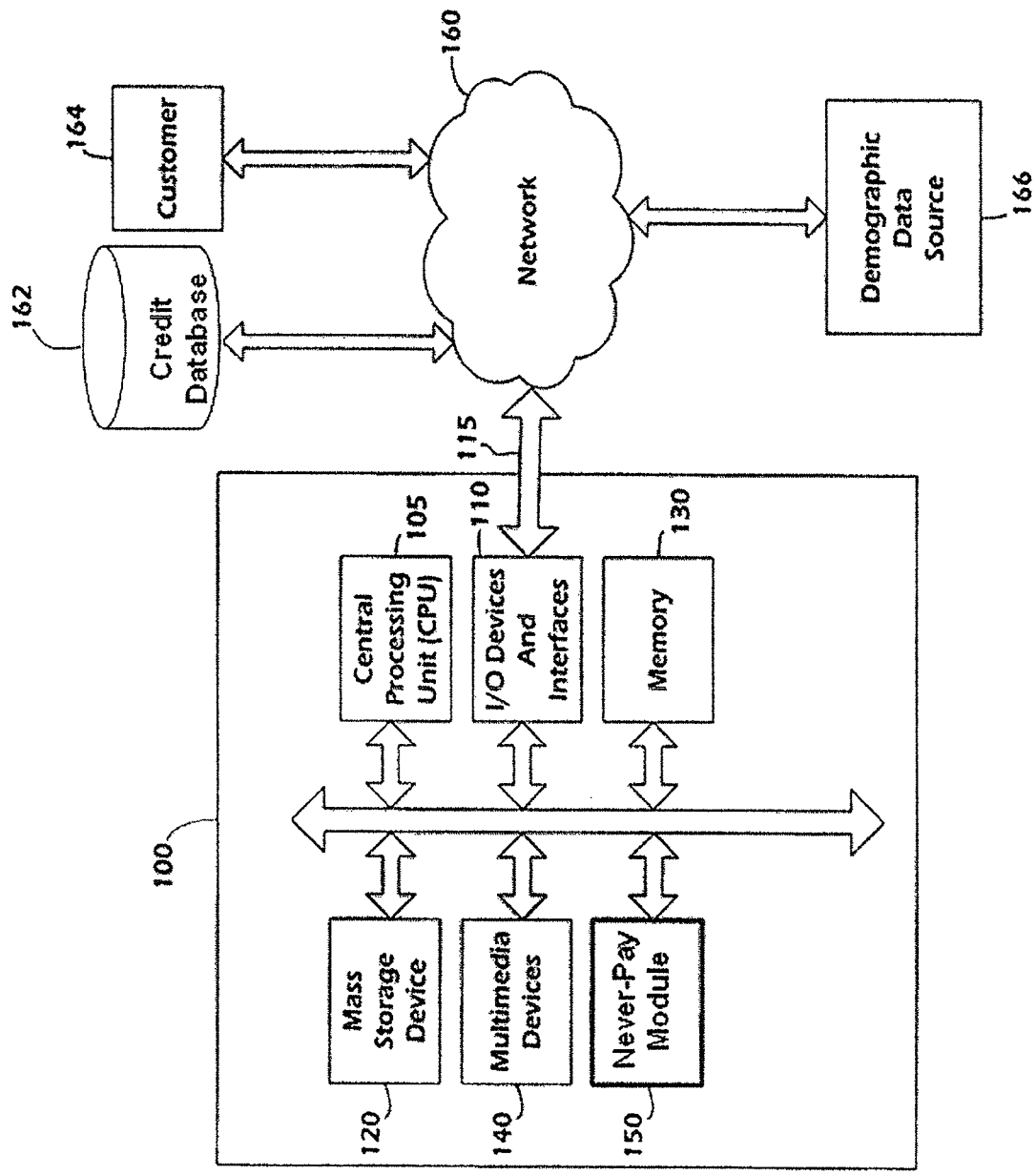
FIG. 1 is a block diagram illustrating an embodiment of a computer hardware system configured to run software for implementing one or more embodiments of the never-pay data filter system described herein.

Embodiments of the invention will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may comprise several novel features, no single one of which is solely responsible for its desirable attributes or which is essential to practicing the inventions herein described.

As used herein the terms "individual(s)," "customer(s)," "consumer(s)", "applicant(s)", or "business(es)", as used herein, are broad terms and are to be interpreted to include without limitation applicants, consumers, customers, single individuals as well as groups of individuals (for example, married couples or domestic partners or the like), business entities, organizations, or the like.

In general, the term "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as, for example, an EPROM. It will be further appreciated that hardware modules may be comprised of connected logic units, such as, for example, gates and flip-flops, and/or may be comprised of programmable units, such as, for example, programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

In general, the terms "data filter," "model," and "profile" as used herein are broad terms that are interchangeable, and generally refer without limitation to systems, devices, and methods for amplifying, selecting, filtering, excluding, predicting, and/or identifying subsets of a dataset that are relevant, substantially relevant, and/or statistically relevant to the user.

As used herein, the terms "financial entity," "credit providers," "credit issuers," "financial institutions," "clients," "utility providers," "utility service providers," "phone service providers," "financial service providers," are broad interchangeable terms and generally refer without limitation to banks, financial companies, credit unions, savings institutions, retailers, utility (telecommunications, gas, electric, water, sewer, or the like) providers, bankcard issuers, credit card issuers, mortgage (for example, sub-prime) lenders, and the like.

Generally, the terms "never-pay" and "straight roller" as used herein are broad terms that are interchangeable, and generally refer without limitation to those customers that make a request for credit, subsequently obtain the credit instrument, and over the life of the account, never make a payment or substantially never make a payment. In an embodiment, the terms "substantially never make a payment" or "substantially likely never to make a payment" are based on various factors including without limitation type of credit/loan, number of credit/loan payments, duration of credit/loan period, amount of credit/loan, size of payment of credit/loan, or the like. Additionally, the foregoing broad terms can also refer without limitation to a booked account that rolls straight to loss without the lender, credit issuer, or the like collecting any fund from the consumer.

Data filters, models, and/or profiles for identifying and/or predicting the never-pay population (for example, those customers that make a request for credit and obtain the credit instrument but over the life of the account, never make a payment) can be useful to various commercial entities, such as those issuing mortgages, home equity lines of credit, consumer or business lines of credit, automobile loans, credit card accounts, or those entities providing services, such as utility services, phone services, and the like.

Some acquisition risk data filters/models and fraud data filters/models identify the respective subsets of the never pay population that align with acquisition risk or fraud data filters/models that they are configured to predict. Such risk models tend to focus on the macro level of risk (for example, 90+ days past due and bankruptcy), while such fraud models attempt to identify some form of fraud, typically identity fraud. The never pay population is, however, comprised of multiple models and/or profiles, some of which do not entirely resemble those of acquisition risk and/or fraud data filters/models of credit risk consumers. Accordingly, in an embodiment, the never-pay data filters and/or profiles include without limitation, the following, and those skilled in the art will recognize other possible data filters, models, and/or profiles without limiting the scope of the disclosure herein.

a) Credit risk data filter and/or profile/model—consumers whose credit profiles include multiple delinquent or derogatory tradelines. These consumers tend to score poorly on risk models, such as, for example, VantageScore$^{SM}$ or other scores such as, generic risk scores.

b) No intent to pay data filter and/or profile/model—a behavioral pattern in which a consumer seeks and obtains credit with no intention of ever paying the debt obligation.

c) Synthetic credit data filter and/or profile/model—the combining of real and fictitious identification data in order to establish a consumer credit profile. These profiles may not resemble those of a risky consumer. Therefore, risk scores tend to have difficulty identifying these profiles.

d) True name fraud data filter and/or profile/model (for example, second party fraud or third party fraud)—assuming another person's identity in order to open a new credit account. This is typically referred to as "second party" or "third party" fraud. Second party fraud (or familiar fraud) is generally committed by someone known by or close to a genuine customer, usually a relative or employee. Third party fraud is generally fraud committed by an unrelated third party.

e) Credit manipulation data filter and/or profile/model (for example, first party fraud)—providing false information to obtain credit on more favorable terms.

Because the accounts for the never-pay population tend to have above average balance amounts, the losses attributed to such accounts are higher than the losses attributed to normal bad credit accounts. To identify and/or limit the liability incurred by the above, methods and systems are disclosed herein to identify the never-pay population using a never-pay data filters/models and scoring system that complements risk scores.

With reference to FIG. 1, there is illustrated an embodiment of a block diagram of a computing system 100 that is in communication with a network 160 and various devices that are also in communication with the network 160. The computing system 100 may be used to implement certain systems and methods described herein. For example, in an embodiment the computing system 100 may be configured to receive financial and demographic information regarding individuals and generate models to apply to data of the individuals. The functionality provided for in the components and modules of computing system 100 may be combined into fewer components and modules or further separated into additional components and modules.

The computing system 100 includes, for example, a personal computer that is IBM, Macintosh, or Linux/Unix compatible. In an embodiment, the computing device comprises a server, a laptop computer, a cell phone, a personal digital assistant, a kiosk, or an audio player, for example. In an embodiment, the exemplary computing system 100 includes a central processing unit ("CPU") 105, which may include a conventional microprocessor. The computing system 100 further includes a memory 130, such as, for example, random access memory ("RAM") for temporary storage of information and a read only memory ("ROM") for permanent storage of information, and a mass storage device 120, such as, for example, a hard drive, diskette, or optical media storage device. Typically, the modules of the computing system 100 are connected to the computer using a standards based bus system. In different embodiments, the standards based bus system could be Peripheral Component Interconnect (PCI), Microchannel, SCSI, Industrial Standard Architecture (ISA) and Extended ISA (EISA) architectures, for example.

The computing system 100 is generally controlled and coordinated by operating system software, such as, for example, Windows 95, Windows 98, Windows NT, Windows 2000, Windows XP, Windows Vista, Linux, SunOS, Solaris, or other compatible operating systems. In Macintosh systems, the operating system may be any available operating system, such as, for example, MAC OS X. In other embodiments, the computing system 100 may be controlled by a proprietary operating system. Conventional operating systems control and schedule computer processes for execution, perform memory management, provide file system, networking, and I/O services, and provide a user interface, such as, for example, a graphical user interface ("GUI"), among other things.

The exemplary computing system 100 includes one or more commonly available input/output (I/O) devices and interfaces 110, such as, for example, a keyboard, mouse, touchpad, and printer. In an embodiment, the I/O devices and interfaces 110 include one or more display device, such as, for example, a monitor, that allows the visual presentation of data to a user. More particularly, a display device provides for the presentation of GUIs, application software data, and multimedia presentations, for example. The computing system 100 may also include one or more multimedia devices 140, such as, for example, speakers, video cards, graphics accelerators, and microphones, for example.

In the embodiment of FIG. 1, the I/O devices and interfaces 110 provide a communication interface to various external devices. In the embodiment of FIG. 1, the computing system 100 is coupled to a network 160, such as, for example, a LAN, WAN, or the Internet, for example, via a wired, wireless, or combination of wired and wireless, communication link 115. The network 160 communicates with various computing devices and/or other electronic devices via wired or wireless communication links. In the exemplary embodiment of FIG. 1, the network 160 is coupled to a credit database 162, a demographic data source 166, such as, for example, a government public information database, and a customer 164, such as, for example, a financial institution that is interested in the financial opportunity associated with particular individual. The information supplied by the various data sources may include credit data, demographic data, application information, product terms, accounts receivable data, and financial statements, for example. In addition to the devices that are illustrated in FIG. 1, the network 160 may communicate with other data sources or other computing devices. In addition, the data sources may include one or more internal and/or external data sources. In some embodiments, one or more of the databases or data sources may be implemented using a relational database, such as, for example, Sybase, Oracle, CodeBase and Microsoft® SQL Server as well as other types of databases such as, for example, a flat file database, an entity-relationship database, and object-oriented database, and/or a record-based database.

In the embodiment of FIG. 1, the computing system 100 also includes an application module that may be executed by the CPU 105. In the embodiment of FIG. 1, the application module includes a never-pay module 150, which is discussed in further detail below. This module may include, by way of example, components, such as, for example, software components, object-oriented software components, class components and task components, processes, functions, attributes, procedures, subroutines, segments of program code, drivers, firmware, microcode, circuitry, data, databases, data structures, tables, arrays, and variables.

In the embodiments described herein, the computing system 100 is configured to execute the never-pay module 150, among others, in order to create models/profiles and/or to provide assessment information regarding certain customers, individuals or entities. For example, in an embodiment the computing system 100 creates models that determine the propensity of an individual to be a never-pay record and assesses a never-pay score of an individual or customer that comprises a never-pay record or comprises attributes of a never-pay model. As another example, in an embodiment the computing system 100 applies the created models to determine the propensity of a particular individual/customer or set of individuals/customers to be a never-pay record and assesses the never-pay score of the individual/customer or set of individuals/customers assessed or deemed to be never-pay records. Various other types of scores, related to other types of market opportunities, may also be generated by the computing system 100. As noted above, although the description provided herein refers to individuals or customers, the terms individual and customer should be interpreted to include applicants, or groups of individuals or customers or applicants, such as, for example, married couples or domestic partners, organizations, and business entities.

Figure 2:
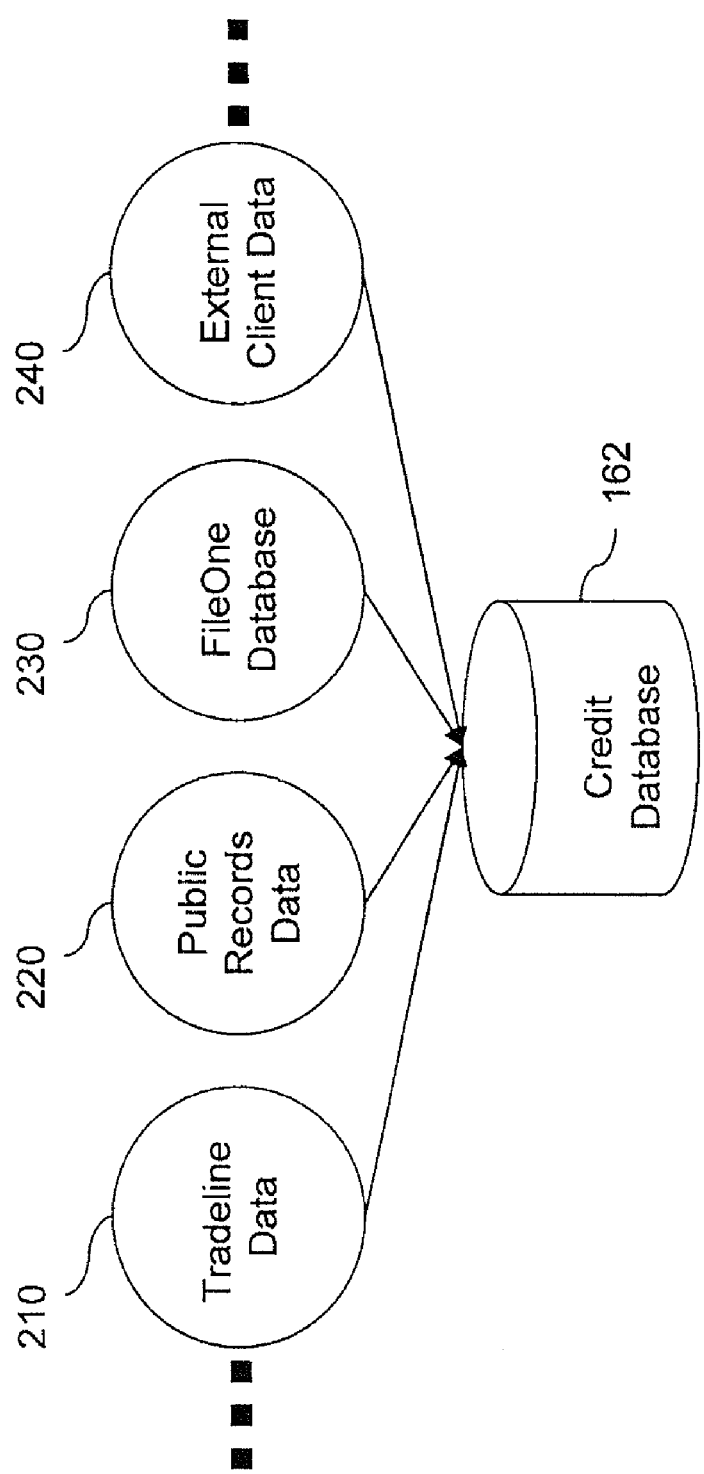
FIG. 2 is a block diagram depicting an embodiment of a credit database that comprises data obtained from various data sources.

FIG. 2 depicts a diagram illustrating that in another embodiment the credit database 162 comprises data and/or bureau data obtained from various data sources, including but not limited to tradeline data 210, public records data 220, the Experian® FileOne$^{SM}$ database 230, and external client data 240. Public records data can include without limitation court house records, litigation records, tax data, recorded liens, foreclosure data, bankruptcy data, driving records data, police records data, criminal records data, personal data from public data sources (for example, newspapers, internet pages, for example, blogs, or the like). In addition, the data may include externally stored and/or internally stored data. In certain embodiments, tradeline data 210 and public records data 220 alternatively feed into the FileOne$^{SM}$ database 230. The credit database 162 can comprise only a subset of the data available from the various data sources set forth above.

Figure 3:
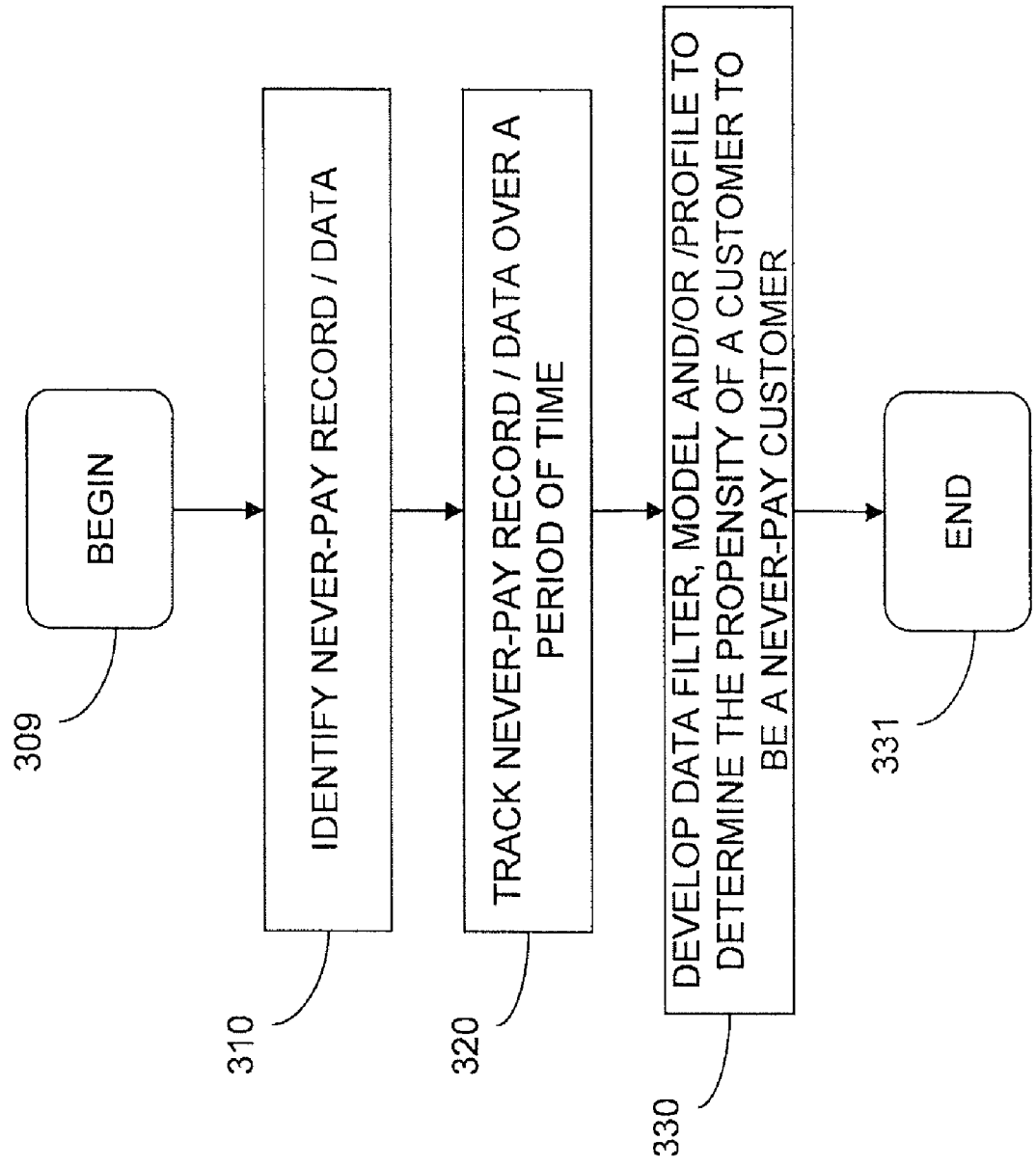
FIG. 3 is a flowchart diagram illustrating an embodiment for analyzing data to create never-pay data filters, models and/or profiles.

Referring to FIG. 3, there is depicted another embodiment of a flowchart illustrating one method (for example, a computer implemented method) of analyzing bureau data, tradeline data, and/or other data (for example, historical balance and credit limits for a period of time, such as, for example, a twenty-four month period) to create never-pay data filters, models and/or profiles. The method can be performed on real-time, batch, periodic, and/or delayed basis for individual records or a plurality of records. The exemplary method may be stored as a process accessible by the never-pay module 150 and/or other components of the computing system 100. Depending on the embodiment, certain of the blocks described below may be removed, others may be added, and the sequence of the blocks may be altered.

With reference to FIG. 3, the method at block 309 is initiated, and the never-pay data filters/models generation system identifies the never-pay records/data at block 310. In an embodiment, the never-pay records data includes without limitation consumer demographic, credit, and other data (for example, bureau data, tradeline data, historical balance data for a period of time, credit limits data for a period of time, or the like). The identified never-pay records data can also include without limitation archived data or a random selection of current data. The never-pay records/data may come from various data sources, including those discussed above with reference to FIGS. 1 and 2. As those of skill in the art will recognize, specific criteria for being categorized as a never-pay record may vary greatly and may be based on a variety of possible data types and different ways of weighing the data. At block 320, the never-pay records are tracked over a period of time. This tracking may include without limitation real time tracking as well as selecting records/data from a previous time frame. In certain embodiments, tracking occurs by analyzing records at one point in time, and then analyzing the same records at another point in time.

In FIG. 3 at block 330, a data filter, model, and/or profile is developed based on the tracked records, which determines the propensity of an individual/customer to become a never-pay record, for example, a first, second, third, or other payment default. In an embodiment, the development of the data filter, model, and/or profile comprises identifying consumer characteristics, attributes, or segmentations that are statistically correlated (for example, a statistically significant correlation) with the occurrence of a never-pay record. In an embodiment, the development of the data filter, model, and/or profile comprises developing a set of heuristic rules, filters, and/or electronic data screens to determine and/or identify and/or predict which consumer profiles would be classified as a never-pay consumer based on various data, such as, for example, bureau data, tradeline data, historical balance data for a period of time, credit limits data for a period of time, or the like. The development of data filters, models, and/or profiles can also comprise developing a set of heuristic rules, filters, and/or electronic data screens to determine and/or identify and/or predict which identified never-pay tradelines are attributable to identity theft based on using bureau data, consumer identification data, and/or the like. It is recognized that other embodiments of FIG. 3 may be used. For example, the method of FIG. 3 could be repeatedly performed to create multiple never-pay data filters, models, and/or profiles.

Figure 4:
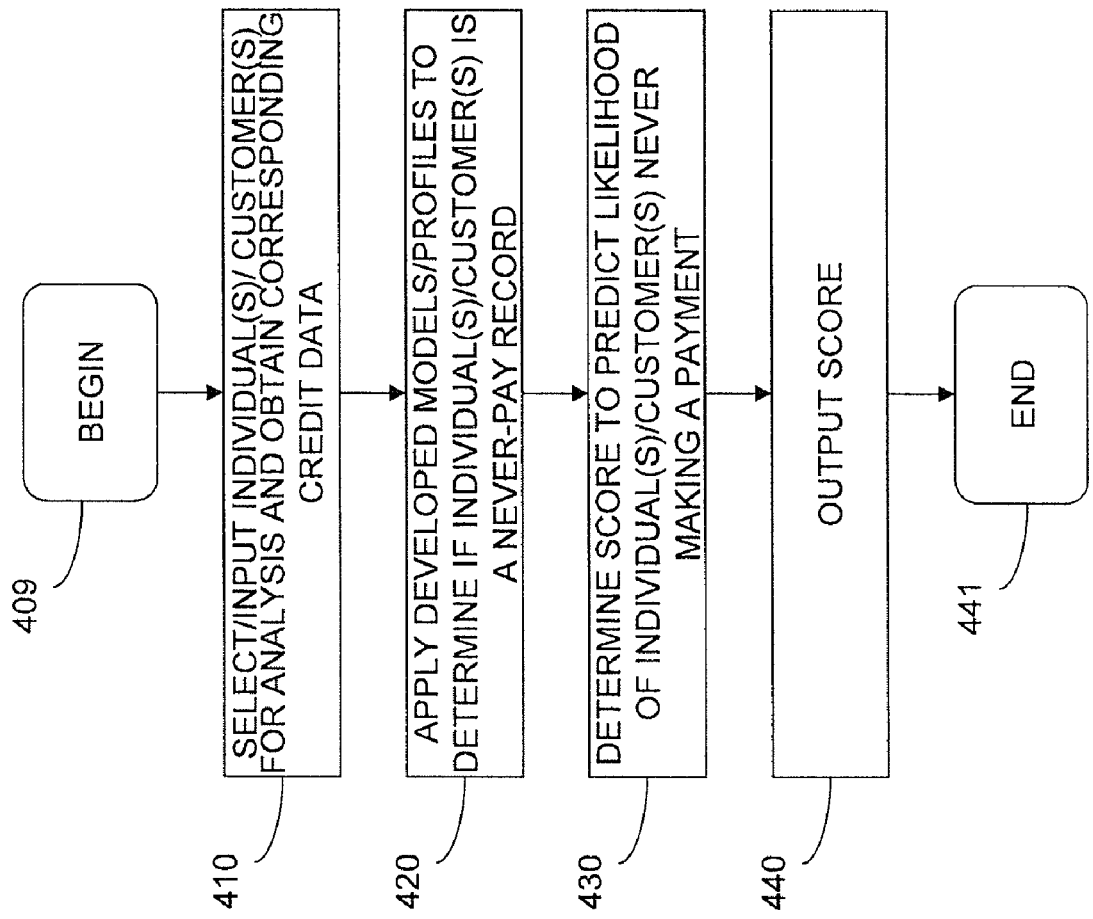
FIG. 4 is a flowchart diagram illustrating an embodiment for analyzing data to apply never-pay data filters, models, and/or profiles to assess the propensity of a customer to become a never-pay record.

Referring to FIG. 4, there is depicted another embodiment of a flowchart illustrating a method (for example, a computer implemented method) of analyzing data to apply never-pay data filters, models, and/or profiles to assess the propensity of a customer to become a never-pay record. The exemplary method may be stored as a process accessible by the never-pay module 150 and/or other components of the computing system 100. Depending on the embodiment, certain of the blocks described below may be removed, others may be added, and the sequence of the blocks may be altered.

With reference to FIG. 4, the method is initiated at block 409, and the never-pay data filters/models application system at block 410 selects or receives consumer(s) information and data wherein analysis is performed on the consumer(s). In certain embodiments, block 410 also includes the step of obtaining credit data, bureau data, tradeline data, and/or other data from the credit database 162. At block 420, the never-pay data filters/models application system analyzes the obtained credit data by applying the developed data filter(s), model(s), and/or profile(s) from block 330 to the obtained credit data to determine if the consumer(s) exhibits characteristics and/or attributes of a never-pay record. Based on the analysis completed at block 420, a score is determined at block 430 to predict the likelihood that the consumer(s) is a never-pay record. In an embodiment, the never-pay data filters/models application system at block 420 can select an appropriate data filter from a plurality of filters stored in a data filter repository, wherein the selection of an appropriate data filter can be based on various factors such as price, speed of response, geographic region, the clients account, or the like. At block 440, the determined never-pay score is sent to the user or another module, system, network, or the like.

Figure 5:
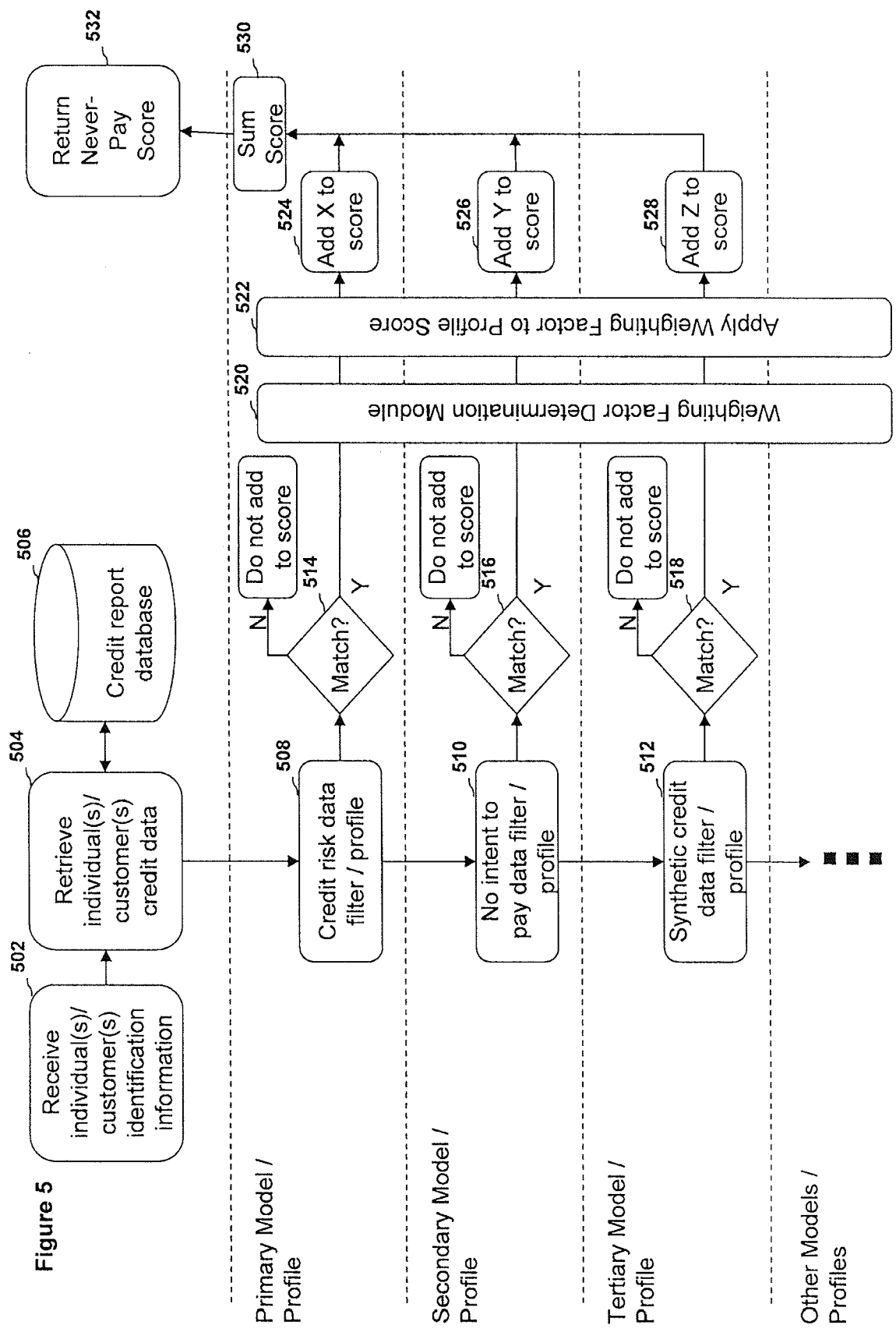
FIG. 5 is flowchart diagram illustrating an embodiment wherein multiple data filters, models, and/or profiles are applied to the credit data of an individual(s)/customers(s) to determine an aggregate never-pay score.

Referring to FIG. 5, there is depicted an embodiment of a flowchart illustrating a method (for example, a computer implemented method) wherein multiple never-pay data filters, models and/or profiles are applied to the data (for example, the credit data, tradeline data, demographic data, or the like) of a consumer(s) to determine an aggregate never-pay score. In the illustrated embodiment, the never-pay data filters, models, and/or profiles include, but are not limited to, the credit risk profile, the no intent to pay profile, the synthetic credit profile, or the like. In certain embodiments, different values are combined to form the aggregate never-pay score depending on whether the data exhibits attributes of a particular never-pay profile. For example, if the credit data exhibits attributes or matches the no intent to pay profile then the value of Y is added to the aggregate never-pay score whereas if the credit data exhibits attributes or matches the credit risk profile then only a value of X is added to the aggregate credit score.

In the illustrated embodiment depicted in FIG. 5, the never-pay data filters/models application system receives individual(s)/customer(s) data, including without limitation identification and/or demographic information/data about the individual(s)/customer(s). At block 504, never-pay data filters/models application system uses the identification and/or demographic information/data to retrieve the credit data of the individual(s)/customer(s) from credit report database 506, which in an embodiment is the credit database 162 illustrated in FIG. 1 and FIG. 2. At block 508, the identification/demographic information/data and/or the credit data of the individual(s)/customer(s) is analyzed, compared with, or passed through the credit risk data filter, model, and/or profile to determine whether the individual(s)/customer(s) exhibits the characteristics, attributes, and/or qualities of a credit risk profile. For example, the credit risk data filter, model, and/or profile can determine whether the individual(s)/customer(s) exhibits a VantageScore$^{SM}$ or other score below a certain threshold, or is past due in certain accounts, or is bankrupt, or has committed fraud, or the like. If at block 514 the identification/demographic information/data and/or the credit data of the individual(s)/customer(s) matches the credit risk data filter, model, and/or profile 508 then the never-pay data filters/models application system assigns a score to the individual(s)/customer(s), wherein certain embodiments the assigned score is based on how closely the individual(s)/customer(s) matches the credit risk data filter, model, and/or profile.

Referring to FIG. 5 at block 520, the never-pay data filters/models application system determines a weighting factor to apply to the credit risk profile score. In an embodiment, the weighting factor is predetermined or static, and in another embodiment, the weighting factor is dynamically determined (for example, the weighting factor is dynamically determined based on whether the individual(s)/customer(s) matches other data filters, models, and/or profiles, or whether the data filter, model, or profile has been recently updated, or the like). If at block 514 the identification/demographic information/data and/or the credit data of the individual(s)/customer(s) does not match the credit risk data filter, model, and/or profile 508 then no score is added to the aggregate never-pay score.

In FIG. 5 at block 510, the identification/demographic information/data and/or the credit data of the individual(s)/customer(s) is analyzed, compared with, or passed through the no intent to pay data filter, model, and/or profile to determine whether the individual(s)/customer(s) exhibits the characteristics, attributes, and/or qualities of a consumer that has no intent or substantially no intent to make a payment on the account. For example, the no intent to pay data filter, model, and/or profile can analyze the consumer's prior behavioral patterns to determine whether the consumer has sought and obtained credit and never paid the debt obligation, or analyze whether the current behavioral patterns of the consumer exhibit an intent never to pay the debt obligation (for example, intent can be exhibited by a consumer's recent bankruptcies or high number of recent delinquencies or the like). If at block 516 the identification/demographic information/data and/or the credit data of the individual(s)/customer(s) matches the no intent to pay data filter, model, and/or profile 510 then the never-pay data filters/models application system assigns a score to the individual(s)/customer(s), wherein certain embodiments the assigned score is based on how closely the individual(s)/customer(s) matches the no intent to pay data filter, model, and/or profile.

Referring to FIG. 5 at block 520, the never-pay data filters/models application system determines a weighting factor to apply to the no intent to pay profile score. In an embodiment, the weighting factor is predetermined or static, and in another embodiment, the weighting factor is dynamically determined (for example, the weighting factor is dynamically determined based on whether the individual(s)/customer(s) matches other data filter, model, or profile, or whether the data filter, model, or profile has been recently updated, or the like). If at block 516 the identification/demographic information/data and/or the credit data of the individual(s)/customer(s) does not match the no intent to pay data filter, model, and/or profile 510 then no score is added to the aggregate never-pay score.

In FIG. 5 at block 512, the identification/demographic information/data and/or the credit data of the individual(s)/customer(s) is analyzed, compared with, or passed through the synthetic credit data filter, model, and/or profile to determine whether the individual(s)/customer(s) exhibits the characteristics, attributes, and/or qualities of a consumer that has combined real and fictitious identification and credit data in order to establish a consumer credit profile. For example, the never-pay data filters/models application system can compare the data inputted in a credit application form created by the individual(s)/customer(s) with the credit and demographic data stored in the credit report database 506 to identify real and fictitious identification data and credit data. If at block 518 the identification/demographic information/data and/or the credit data of the individual(s)/customer(s) matches the synthetic credit data filter, model, and/or profile 512 then the never-pay data filters/models application system assigns a score to the individual(s)/customer(s), wherein certain embodiments the assigned score is based on how closely the individual(s)/customer(s) matches the synthetic credit data filter, model, and/or profile.

Referring to FIG. 5 at block 520, the never-pay data filters/models application system determines a weighting factor to apply to the synthetic credit profile score. In an embodiment, the weighting factor is predetermined or static, and in another embodiment, the weighting factor is dynamically determined (for example, the weighting factor is dynamically determined based on whether the individual(s)/customer(s) matches other data filter, model, or profile, or whether the data filter, model, or profile has been recently updated, or the like). If at block 518 the identification/demographic information/data and/or the credit data of the individual(s)/customer(s) does not match the synthetic credit data filter, model, and/or profile 512 then no score is added to the aggregate never-pay score.

With reference to FIG. 5, in an embodiment, the weighting factor determination module 520 identifies all the various never-pay profiles that the consumer matches and then determines the unique weighting factor to apply to each of the profile scores. The assigned unique weighting factor is applied to the profile score at block 522 and the adjusted profile scores are summed at block 530 to generate or output an aggregate never-pay score for the consumer(s) at block 532.

Figure 5A:
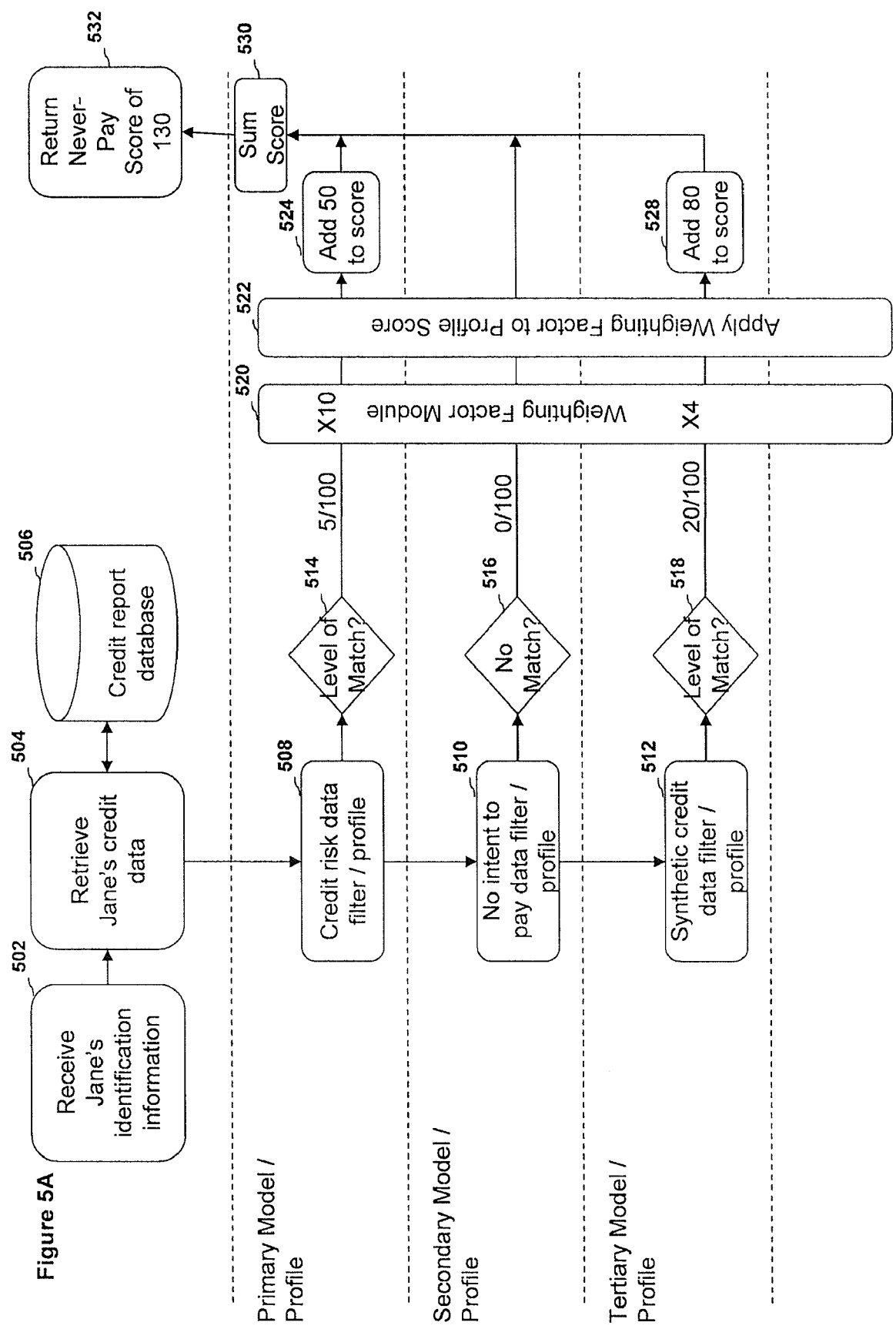
FIG. 5A is flowchart diagram illustrating an embodiment wherein multiple data filters, models, and/or profiles are applied to the credit data of a particular individual to determine an aggregate never-pay score.

FIG. 5A depicts an embodiment of applying the method illustrated in FIG. 5 to determine an aggregate never-pay score for an individual named Jane. In this example, Jane's credit data exhibits certain qualities, characteristics, and/or attributes of the credit risk data filter, model, and/or profile. At block 514, based on the level of match or similarity of Jane's credit data to the credit risk data filter, model, and/or profile, the system assigned Jane a first never-pay score of 5 out of 100 possible points. At block 516, based on the level of match or similarity of Jane's credit data to the no intent to pay data filter, model, and/or profile, the system assigned Jane a second never-pay score of 0 out of 100 possible points, indicating that Jane did not exhibit any or only a few qualities, characteristics, or attributes of the no intent to pay profile. At block 518, based on the level of match or similarity of Jane's credit data to the synthetic credit data filter, model, and/or profile, the system assigned Jane a third never-pay score of 20 out of 100 possible points. The weighting factor determination module 520 analyzes which data filters were triggered or matched with Jane's credit data and determines an appropriate weighting factor to assign to each never-pay score. Here, this illustrative example, the weighting factor determination module 520 assigned a factor of 10 to the credit risk data filter and a factor of 4 to the synthetic credit data filter, indicating that the credit risk data filter is a better predictor than the synthetic credit data filter of Jane's intent to never make a payment. The individual never-pays scores are combined to generate an aggregate never-pay score at blocks 530 and 532.

Figure 6:
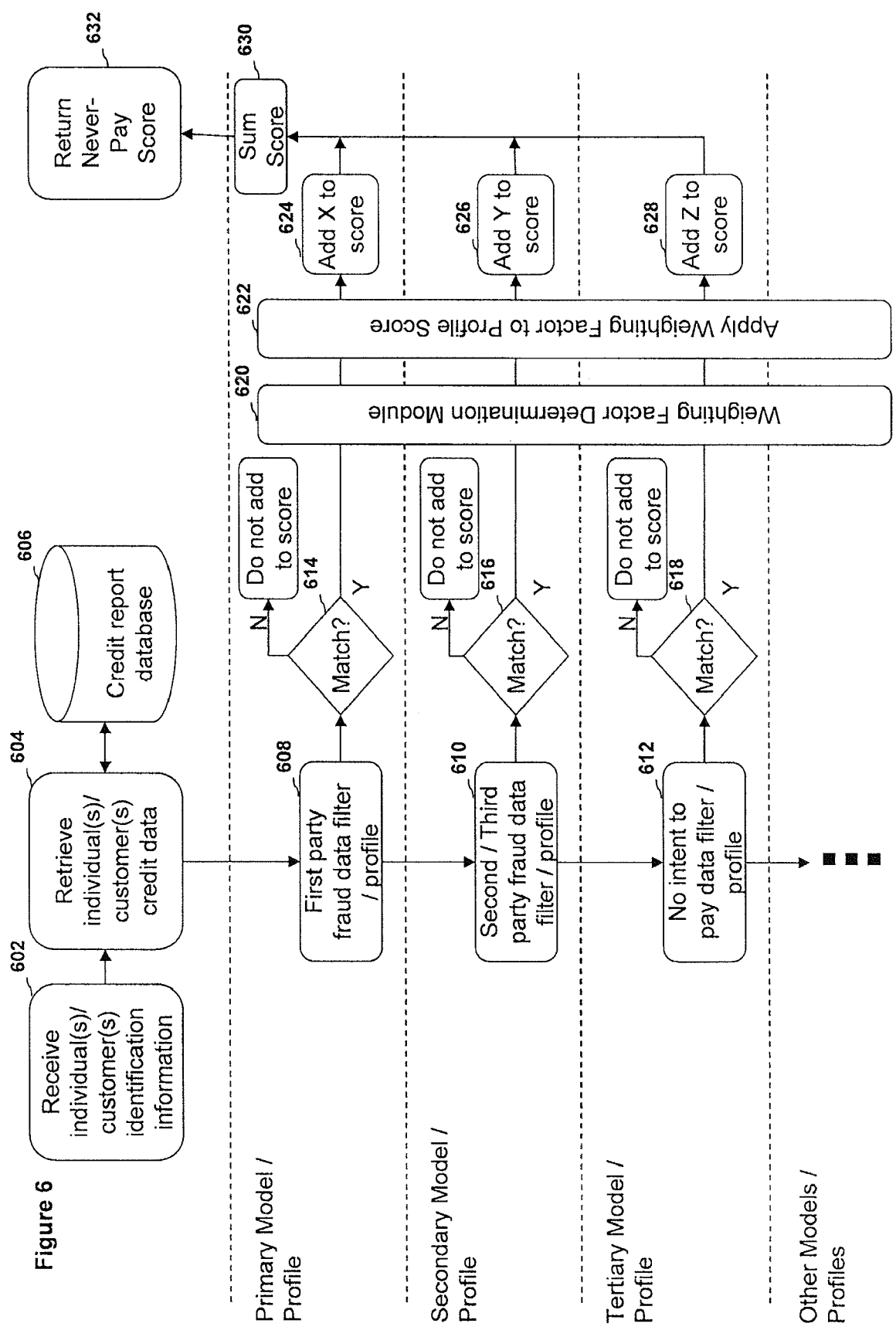
FIG. 6 is flowchart diagram illustrating an embodiment wherein other data filters, models, and/or profiles are applied to the credit data of an individual(s)/customers(s) to determine an aggregate never-pay score.

FIG. 6 is flowchart diagram illustrating an embodiment wherein other data filters, models, and/or profiles are applied to the credit data of an individual(s)/customers(s) to determine an aggregate never-pay score. In the illustrated embodiment, the never-pay data filters, models, and/or profiles include but are not limited to the first party fraud profile, the second/third party profile, the no intent to pay profile, or the like. In certain embodiments, different values are added to the aggregate never-pay score depending on whether the credit data exhibits attributes of a particular never-pay profile.

With reference to FIG. 6 at block 608, the identification/demographic information/data and/or the credit data of the individual(s)/customer(s) is analyzed, compared with, or passed through the first party data filter, model, and/or profile to determine whether the individual(s)/customer(s) exhibits the characteristics, attributes, and/or qualities of a first party profile. For example, the first party data filter, model, and/or profile can determine whether the individual(s)/customer(s) has provided false information to obtain credit on more favorable terms, or the like. If at block 614 the identification/demographic information/data and/or the credit data of the individual(s)/customer(s) matches the first party data filter, model, and/or profile 608 then the never-pay data filters/models application system assigns a score to the individual(s)/customer(s), wherein certain embodiments the assigned score is based on how closely the individual(s)/customer(s) matches the first party data filter, model, and/or profile. For example, the assigned score can be increased if a certain number of application data elements are determined to be false.

Referring to FIG. 6 at block 620, the never-pay data filters/models application system determines a weighting factor to apply to the first party profile score. In an embodiment, the weighting factor is predetermined or static, and in another embodiment, the weighting factor is dynamically determined (for example, the weighting factor is dynamically determined based on whether the individual(s)/customer(s) matches other data filter, model, or profile, or whether the data filter, model, or profile has been recently updated, or the like). If at block 614 the identification/demographic information/data and/or the credit data of the individual(s)/customer(s) does not match the first party data filter, model, and/or profile 608 then no score is added to the aggregate never-pay score.

In FIG. 6 at block 610, the identification/demographic information/data and/or the credit data of the individual(s)/customer(s) is analyzed, compared with, or passed through the second party and/or third party data filter, model, and/or profile to determine whether the individual(s)/customer(s) exhibits the characteristics, attributes, and/or qualities of a consumer that assumed another person's identity in order to open a new credit account. For example, the second party and/or third party data filter, model, and/or profile can analyze whether a consumer has assumed the identity of someone known to the consumer (second party fraud, for example, using a social security number having a high probability of belonging to another or the observance of certain patterns or trends in credit bureau data) or has assumed the identity of someone unrelated to the consumer (third party fraud). If at block 616 the identification/demographic information/data and/or the credit data of the individual(s)/customer(s) matches the second party and/or third party data filter, model, and/or profile 610 then the never-pay data filters/models application system assigns a score to the individual(s)/customer(s), wherein certain embodiments the assigned score is based on how closely the individual(s)/customer(s) matches the second party and/or third party data filter, model, and/or profile.

Referring to FIG. 6 at block 620, the never-pay data filters/models application system determines a weighting factor to apply to the second party and/or third party profile score. In an embodiment, the weighting factor is predetermined or static, and in another embodiment, the weighting factor is dynamically determined (for example, the weighting factor is dynamically determined based on whether the individual(s)/customer(s) matches other data filter, model, or profile, or whether the data filter, model, or profile has been recently updated, or the like). If at block 616 the identification/demographic information/data and/or the credit data of the individual(s)/customer(s) does not match the second party and/or third party data filter, model, and/or profile 610 then no score is added to the aggregate never-pay score. Other data filters, models, and/or profiles to determine whether consumers exhibit the characteristics, attributes, and/or qualities of a never-pay consumer can be applied by the never-pay data filters/models application system to generate an aggregate never-pay score, including without limitation a three-digit zip code level predictor, wherein, for example, the twenty-five largest metro areas are identified and a never-pay risk level is associated with each area. In an embodiment, a data filter, model, and/or profile is based on a set of predictor attributes or variables that summarize the risk across multiple attributes, and these summarized attributes or variables are used in lieu of individual attributes or variables, such that in certain embodiments, the summarized attributes or variables are able to preserve predictiveness of the individual attributes while ensuring a more stable predictor.

Figure 7:
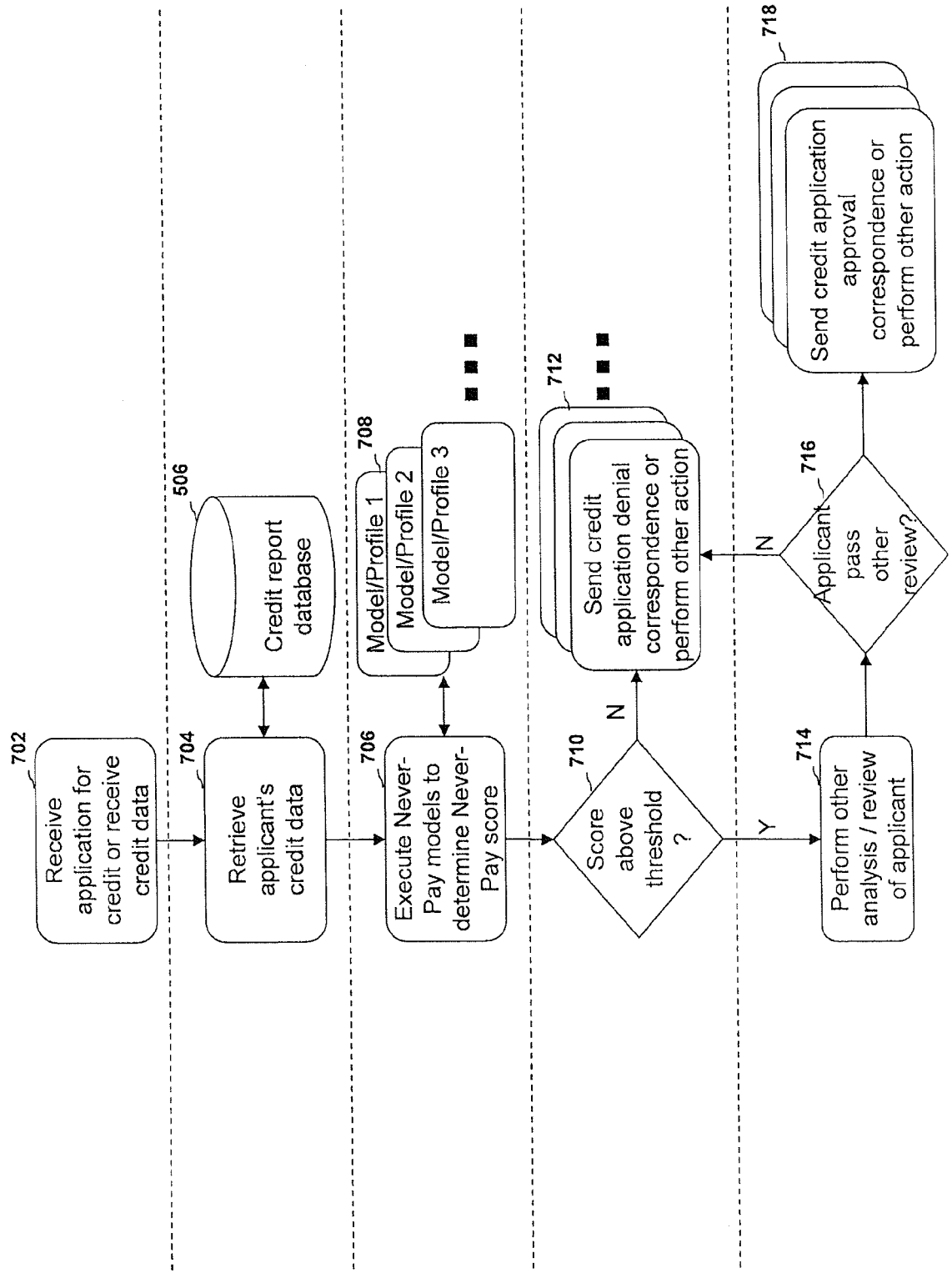

FIG. 7 is flowchart diagram illustrating an embodiment for applying the aggregate never-pay score to determine whether to perform a business action or the like. In the illustrated embodiment, there is illustrated a method wherein the never-pay score for a particular applicant is applied to determine whether a denial correspondence or an approval correspondence is sent to the applicant. As those of skill in the art will recognize, the illustrated method is applicable for analyzing one applicant at a time or multiple applicants in a batch or bulk process.

With reference to FIG. 7, an application for a credit account or a consumer's credit data is received from a third party source (for example, an applicant, a financial services firm, credit card issuer, or the like) at block 702. At block 704 the applicant's or consumer's credit data is retrieved from the credit report database 506. At block 706 the never-pay data filters/models application system applies the never-pay data filters, models, and/or profiles 708 to determine and/or generate a never-pay score for the applicant or the consumer, for example, using the systems and computer implemented methods disclosed with reference to FIGS. 5 and 6. At block 710 the never-pay data filters/models application system determines whether the never pay score is above a threshold. In an embodiment, the threshold level is predetermined by the third party (for example the credit card issuer, or the like), and in other embodiments, the threshold level is dynamically determined based on the consumer, period of time (for example, proximity to end of financial quarter), or proximity to targets or goals (for example, issue one hundred new approved applications).

Referring to FIG. 7, if the never-pay score is below the threshold, then at block 712 the business function to be performed is to, for example, send a credit application denial correspondence to the applicant. In an embodiment, if the never-pay score is at or above the threshold then at block 714 the business function to be performed is to, for example, perform other analysis or review of the application or credit data to determine if the applicant satisfies other criteria at block 716. If the other criteria is satisfied, then at block 718 the business function to be performed is to, for example, send a credit application approval correspondence to the application; otherwise, a credit application denial correspondence is sent to the application at block 712. In another embodiment, if the never-pay score is at or above the threshold then at block 718 the business function to be performed is to, for example, send a credit application approval correspondence to the applicant.

In reference to FIG. 7, there other business functions 712, 718 that can be performed in lieu of the illustrated business functions. For example, in an embodiment, the never-pay data filters/models application system is used to determine a deposit strategy for a new applicant or consumer. For example, a cellular phone company can use the never-pay data filters/models application system to determine whether to require a deposit from a new consumer and/or to determine the amount of the deposit. Credit card issuers and/or other financial institutions can utilize the never-pay data filters/models application system to determine whether a credit limit should be applied to a new consumer and/or to determine the amount of the credit limit to be applied to a new consumer. In an embodiment, banks, credit card issuers, and/or other financial entities can use the never-pay data filters/models application system (with or without other credit scores or the like) to determine whether a credit limit should adjusted up or down for existing consumers. Credit card issuers, banks, and/or other financial entities can use the never-pay data filters/models application system in a pre-screen scenario. For example, a credit card issuer can identity a pool of consumers and use the never-pay data filters/models application system to identify which consumers in the pool that should receive a pre-approved credit account offer. This pre-screen process can be performed on a batch basis or real-time and/or periodic basis. In an embodiment, the never-pay data filters/models application system is used to automatically and/or substantially immediately (for example, on a real-time basis) determine whether credit should be extended to a consumer. For example, a credit card issuer can determine whether to approve an applicant applying online or on the phone for credit. Those skilled in the art will recognize other business functions that can be performed with the never-pay data filters/models application system.

It is recognized that a variety of scoring methods may be used including numeric scores where the lower number indicates a never-pay or where a higher number indicates a never-pay. In addition, other scores may be used such as, for example, letters scores (for example A, B, C, D or F) or categories (for example good, bad), and so forth.

The never-pay model and/or score can be used in or applied to several markets including but not limited to the sub-prime lending market, finance companies, credit unions, savings institutions, retailers, telecommunications companies, bankcard issuers, student loans, other markets wherein credit issuers face risk and/or fraud dilemmas, or any other markets. The never-pay model and/or score is a useful tool for both risk management by allowing risk managers to discriminate on the front-end, and for fraud management by providing fraud managers a better idea on where to focus their efforts.

Additionally, the never-pay data filters, models, profiles, and/or scores can be bundled with a variety of other products and scores including but not limited to VantageScore$^{SM}$ or any other generic score used to improve account acquisition, reduce account acquisition costs, justify credit line adjustments, predict loss rates, predict risks such as bankruptcy, fraud, and so forth, mitigate liability, or the like. A variety of pricing strategies can be applied to the never-pay model and/or score including but not limited to using the never-pay model and/or score as a value added solution, a loss-leader promotion, a free add-on service, a cross-sell opportunity, or the like. Additionally, the never-pay model and/or score can be offered at various price points depending on different factors including but not limited to speed of response, the number of profiles/models applied, the number of records reviewed, or the like.

There are several advantages in using various embodiments of the never-pay data filters/models generation system including without limitation: reducing account acquisition costs by helping to eliminate high-risk prospective consumers that do not fit a credit criteria; gaining better intelligence on consumer behavior and motivation by providing access to the most accurate data to show the most complete picture of the right consumer; gaining greater control over risk by more accurately and precisely identifying the never-pay population; automating decision making processes based on non-judgmental, uniform variables selected based on the internal data and/or client external data; allowing lenders, financial entities, and other entities to better discriminate traditional credit risk more finely to address and meet financial reporting and risk management regulatory requirements; or the like.

In some embodiments, the acts, methods, and processes described herein are implemented within, or using, software modules (programs) that are executed by one or more general purpose computers. The software modules may be stored on or within any suitable computer-readable medium. It should be understood that the various steps may alternatively be implemented in-whole or in-part within specially designed hardware. The skilled artisan will recognize that not all calculations, analyses and/or optimization require the use of computers, though any of the above-described methods, calculations or analyses can be facilitated through the use of computers.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Additionally, the skilled artisan will recognize that any of the above-described methods can be carried out using any appropriate apparatus. Thus, it is intended that the scope of the present invention herein disclosed should not be limited by the particular disclosed embodiments described above.

What is claimed is:

1. A computerized method comprising:
accessing computer-executable instructions from at least one computer-readable storage medium; and
executing the computer-executable instructions, thereby causing computer hardware comprising at least one computer processor to perform operations comprising:
analyzing data associated with a credit line during an application stage for predictive variables for use in a plurality of models for first party fraud, wherein the analyzing includes analyzing information provided by an entity applying for a credit line for false information;
flagging an account during the application stage when at least one or more predictive application stage variables of first party cause a fraud score to exceed a pre-described fraud likelihood threshold;
analyzing data associated with one or more previously flagged, existing credit lines after the application stage for elements to be used in a model to predict first party fraud in one or more of the existing credit lines;
merging a first party fraud score associated with the application with a second first party fraud score associated with the application; and
automatically attempting to contact the entity associated with a flagged account.

2. The computerized method of claim 1 wherein the elements associated with analyzing data associated with one or more previously flagged, existing credit lines includes data.

3. The computerized method of claim 1 wherein analyzing data associated with a credit line during a pre-booked portion of the application stage includes profiling of at least one entity associated with the application process.

4. The computerized method of claim 1 wherein the elements associated with analyzing data associated with one or more previously flagged, existing credit lines includes computed variables.

5. The computerized method of claim 1 wherein analyzing data associated with a credit line during the after application stage includes analyzing the transactions during a selected, initial time period after approving a credit line.

6. The computerized method of claim 5 wherein analyzing the transactions during a selected, initial time period after approving the credit line includes analyzing the number of payments.

7. The computerized method of claim 5 wherein analyzing the transactions during a selected, initial time period after approving the credit line includes analyzing the size of payments.

8. The computerized method of claim 5 wherein analyzing the transactions during a selected, initial time period after approving the credit line includes analyzing the information of credit and loan accounts.

9. The computerized method of claim 5 wherein analyzing the transactions during a selected, initial time period after approving the credit line includes analyzing information associated with customers associated with the credit line.

10. The computerized method of claim 5 wherein analyzing the transactions during a selected, initial time period after approving the credit line includes analyzing the amount of credit or loan.

11. The computerized method of claim 5 wherein analyzing the transactions during a selected, initial time period after approving the credit line includes analyzing customer information.

12. The computerized method of claim 10 wherein a payment on the account has been received.

13. The computerized method of claim 10 wherein a payment on the account has been received, and the payment has not yet cleared.

14. The computerized method of claim 1 wherein analyzing data associated with a credit line during the after application stage includes analyzing the transactions associated with a customer and one or more credit lines.

15. The computerized method of claim 1 wherein analyzing data associated with a credit line during the after application stage includes creation of transaction profile variables associated with the account and customer profiles.

16. The computerized method of claim 1 wherein analyzing data associated with one or more credit lines that have previously been flagged includes searching for a condition where there is a request for an increase in a credit limit associated with the credit line.

* * * * *